United States Patent
Kanai

(10) Patent No.: US 10,523,085 B2
(45) Date of Patent: Dec. 31, 2019

(54) VIBRATION MOTOR

(71) Applicant: Nidec Seimitsu Corporation, Ueda-shi, Nagano-ken (JP)

(72) Inventor: Naoki Kanai, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 560 days.

(21) Appl. No.: 15/221,931

(22) Filed: Jul. 28, 2016

(65) Prior Publication Data

US 2017/0040866 A1     Feb. 9, 2017

(30) Foreign Application Priority Data

Aug. 3, 2015   (JP) ................. 2015-153079

(51) Int. Cl.
*H02K 7/06* (2006.01)
*H02K 33/00* (2006.01)

(52) U.S. Cl.
CPC ............. *H02K 7/063* (2013.01); *H02K 7/061* (2013.01); *H02K 33/00* (2013.01)

(58) Field of Classification Search
CPC ........ H02K 21/02; H02K 21/24; H02K 7/063; H02K 29/03; H02K 33/02; H02K 7/061;
(Continued)

(56) References Cited

U.S. PATENT DOCUMENTS 4,704,566 A * 11/1987 Hirano .................... H02K 29/08
310/156.32
4,733,119 A * 3/1988 Shiraki .................... H02K 29/08
310/193
(Continued)

FOREIGN PATENT DOCUMENTS

CN        204258531 U    4/2015
JP        2009-130969 A  6/2009

OTHER PUBLICATIONS

Takagi; "Vibration Motor", U.S. Appl. No. 15/221,941, filed Jul. 28, 2016.

*Primary Examiner* — Mang Tin Bik Lian
*Assistant Examiner* — Ahmed Elnakib
(74) *Attorney, Agent, or Firm* — Keating & Bennett, LLP

(57) ABSTRACT

A vibration motor includes a base portion arranged to extend perpendicularly to a central axis extending in a vertical direction; a shaft; a coil portion; a bearing portion; a rotor holder; a magnet portion; and an eccentric weight. The base portion includes a base magnetic portion made of a magnetic metal; and a base nonmagnetic portion made of a nonmagnetic metal, fixed to an edge portion of the base magnetic portion, and arranged to extend from the edge portion of the base magnetic portion perpendicularly to the vertical direction. The base magnetic portion includes a plurality of magnetic element portions arranged in a circumferential direction, and arranged at positions opposed to the magnet portion in the vertical direction. The base nonmagnetic portion includes a plurality of nonmagnetic element portions arranged to alternate with the magnetic element portions in the circumferential direction, and arranged at positions opposed to the magnet portion in the vertical direction. The base magnetic portion includes a first boundary portion where the base magnetic portion is in contact with the base nonmagnetic portion. The base nonmagnetic portion includes a second boundary portion where the base nonmagnetic portion is in contact with the base magnetic portion. The base magnetic portion and the base nonmagnetic portion are arranged not to overlap with each other at any position outside of a boundary portion where the first and second boundary portions are in contact with each other when viewed in the vertical direction.

25 Claims, 27 Drawing Sheets

(58) Field of Classification Search
CPC ... H02K 21/023; H02K 21/022; H02K 21/021
USPC .......... 310/12.16, 14, 15, 17, 25, 26, 80, 81,
310/68 R
See application file for complete search history.

(56) References Cited

U.S. PATENT DOCUMENTS

| | | | | |
|---|---|---|---|---|
| 5,097,170 | A * | 3/1992 | Baines | H02K 29/08 310/156.32 |
| 6,172,442 | B1 * | 1/2001 | Jun | H02K 21/24 310/156.26 |
| 6,265,838 | B1 * | 7/2001 | Won | H02K 7/063 310/180 |
| 7,626,295 | B2 * | 12/2009 | Yamaguchi | F04D 29/281 310/156.32 |
| 7,795,769 | B2 * | 9/2010 | Cartwright | F04D 29/646 150/165 |
| 10,363,575 | B2 * | 7/2019 | Mori | |
| 2004/0084980 | A1 * | 5/2004 | Yamaguchi | H02K 7/063 310/81 |
| 2007/0024134 | A1 * | 2/2007 | Huang | H02K 7/063 310/81 |
| 2011/0266901 | A1 * | 11/2011 | Kanai | B06B 1/16 310/81 |
| 2015/0236563 | A1 | 8/2015 | Yamaguchi et al. | |
| 2017/0040866 | A1 * | 2/2017 | Kanai | H02K 7/063 |
| 2017/0040867 | A1 * | 2/2017 | Takagi | H02K 7/063 |
| 2017/0187261 | A1 * | 6/2017 | Takagi | B06B 1/045 |
| 2017/0246664 | A1 * | 8/2017 | Mori | H02K 11/30 |
| 2017/0246665 | A1 * | 8/2017 | Mori | H02K 11/30 |

\* cited by examiner

VIBRATION MOTOR

BACKGROUND OF THE INVENTION

1. Field of the Invention

The present invention relates to a vibration motor.

2. Description of the Related Art

Brushless vibration motors in the shape of a thin coin are typically used as silent notification devices in mobile communication apparatuses or the like, or for other purposes. JP-A 2009-130969 describes such a vibration motor, in which a power supply flexible board 40 is fixed onto a stator magnetic plate 10. Three cogging torque generating round holes h1 to h3, which are arranged in a circumferential direction, are defined in the stator magnetic plate 10. This prevents an annular magnet 50 from stopping at a dead point, which would prohibit a rotating portion from starting rotating.

CN 204258531U discloses a technique of defining a base portion 11 by an insert molding process using a magnetic body and a resin. In this case, the cogging torque generating round holes h1 to h3 as described above are not provided, but the resin, which is a non-magnetic material, is arranged to prevent an annular magnet 90 from stopping at a dead point.

When the size of a vibration motor is to be reduced, a reduction in the size of a base portion is demanded. However, a reduction in the radial dimension of the stator magnetic plate 10 described in JP-A 2009-130969 leads to an increase in the proportion of the total area of the cogging torque generating round holes h1 to h3 to the area of the stator magnetic plate 10. This results in a reduction in the strength of the stator magnetic plate 10. In addition, the strength with which the power supply flexible board 40 is fixed onto the stator magnetic plate 10 is also reduced. According to the technique described in CN 204258531U, the base portion 11 is defined by the insert molding process with the magnetic body and the resin placed one upon the other, and this increases the vertical thickness of the base portion 11, and the vertical dimension of the vibration motor.

SUMMARY OF THE INVENTION

A vibration motor according to a preferred embodiment of the present invention includes a base portion arranged to extend perpendicularly to a central axis extending in a vertical direction; a shaft having a lower end fixed to the base portion, and arranged to project upward along the central axis; a circuit board arranged above the base portion; a coil portion attached to the circuit board, and arranged radially opposite to the shaft with a gap therebetween; a bearing portion attached to the shaft to be rotatable with respect to the shaft above the coil portion; a rotor holder attached to the bearing portion; a magnet portion including a plurality of magnetic poles, and attached to the rotor holder; an eccentric weight attached to the rotor holder; and a cover portion arranged to cover, at least in part, upper and lateral sides of the rotor holder and the eccentric weight, and fixed to an upper end of the shaft and an outer edge portion of the base portion. The base portion includes a base magnetic portion made of a magnetic metal; and a base nonmagnetic portion made of a nonmagnetic metal, fixed to an edge portion of the base magnetic portion, and arranged to extend from the edge portion of the base magnetic portion perpendicularly to the vertical direction. The base magnetic portion includes a plurality of magnetic element portions arranged in a circumferential direction, and arranged at positions opposed to the magnet portion in the vertical direction. The base nonmagnetic portion includes a plurality of nonmagnetic element portions arranged to alternate with the magnetic element portions in the circumferential direction, and arranged at positions opposed to the magnet portion in the vertical direction. The base magnetic portion includes a first boundary portion where the base magnetic portion is in contact with the base nonmagnetic portion. The base nonmagnetic portion includes a second boundary portion where the base nonmagnetic portion is in contact with the base magnetic portion. The base magnetic portion and the base nonmagnetic portion are arranged not to overlap with each other at any position outside of a boundary portion where the first and second boundary portions are in contact with each other when viewed in the vertical direction.

The above preferred embodiment of the present invention is able to achieve a reduction in the thickness of the base portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 2:
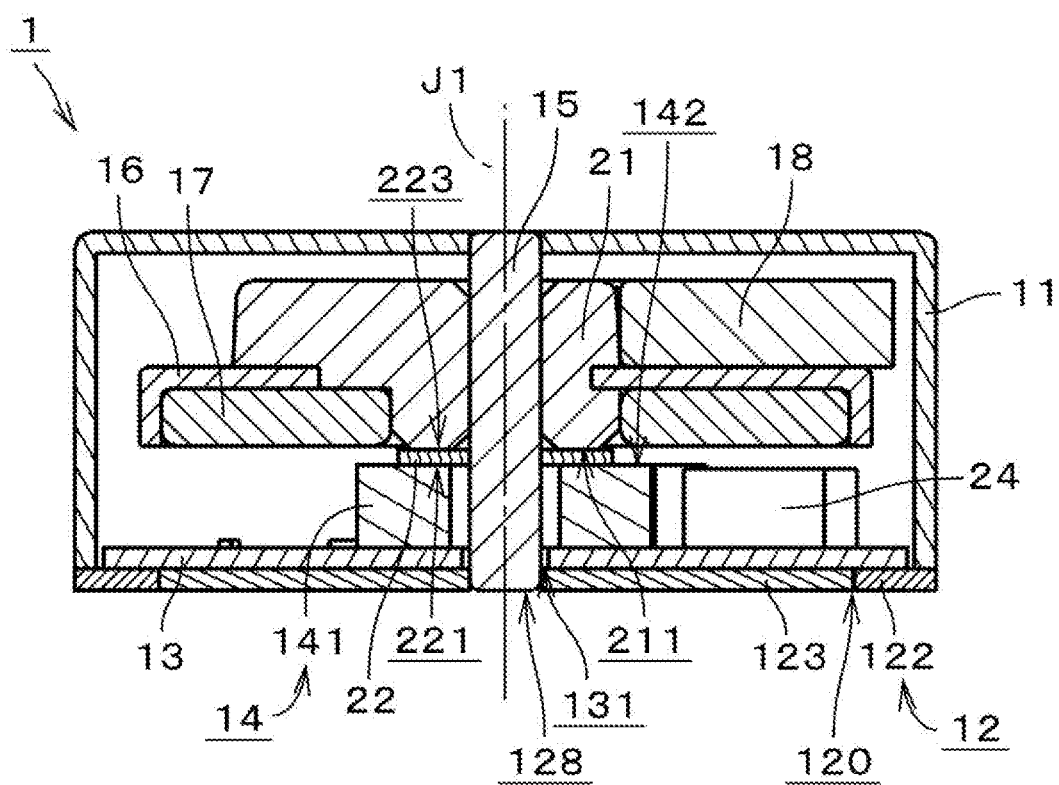
FIG. 2 is a vertical sectional view of the vibration motor.

It is assumed herein that a vertical direction is defined as a direction in which a central axis J1 of a vibration motor 1 extends, and that an upper side and a lower side along the central axis J1 in FIG. 2 are referred to simply as an upper side and a lower side, respectively. It should be noted, however, that the above definitions of the vertical direction and the upper and lower sides are not meant to indicate relative positions or directions of different members or portions when those members or portions are actually installed in a device. It is also assumed herein that a direction parallel to the central axis J1 is referred to as the vertical direction. Further, it is assumed herein that radial directions centered on the central axis J1 are simply referred to by the term "radial direction", "radial", or "radially", and that a circumferential direction about the central axis J1 is simply referred to by the term "circumferential direction", "circumferential", or "circumferentially".

Figure 1:
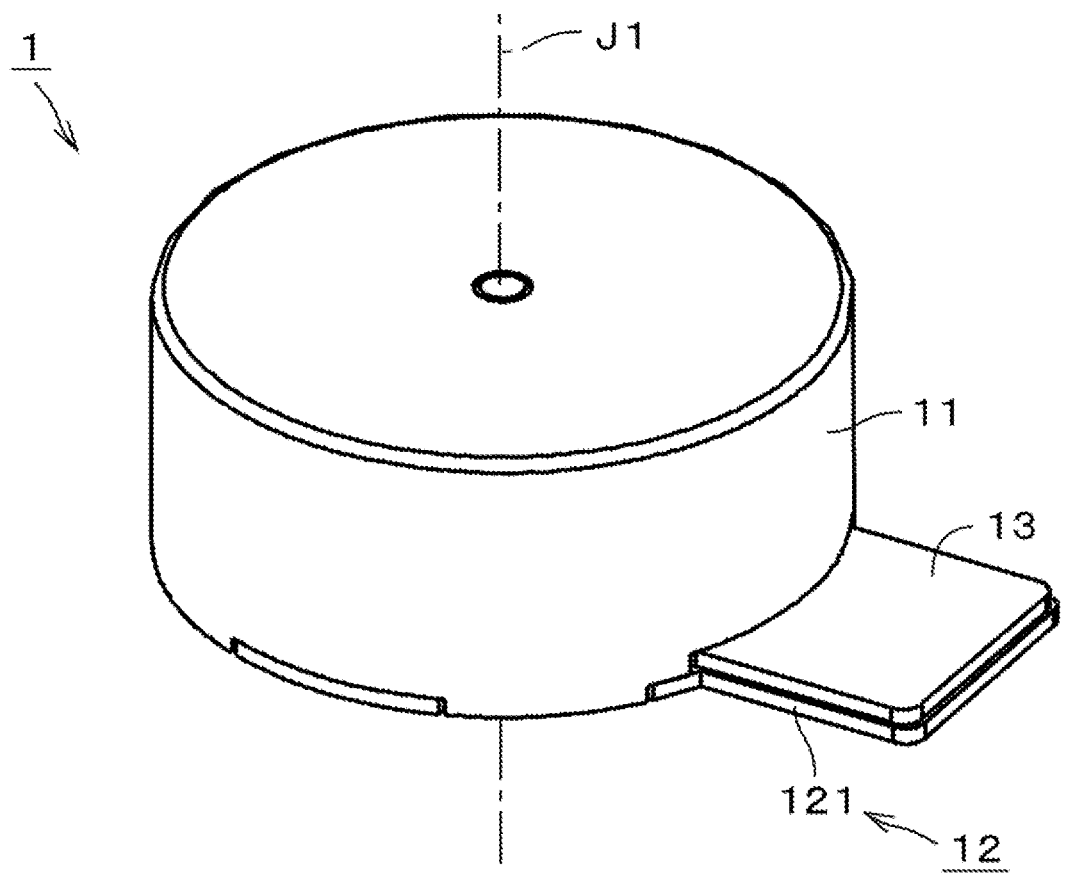
FIG. 1 is a perspective view of a vibration motor according to a first preferred embodiment of the present invention.
Figure 3:
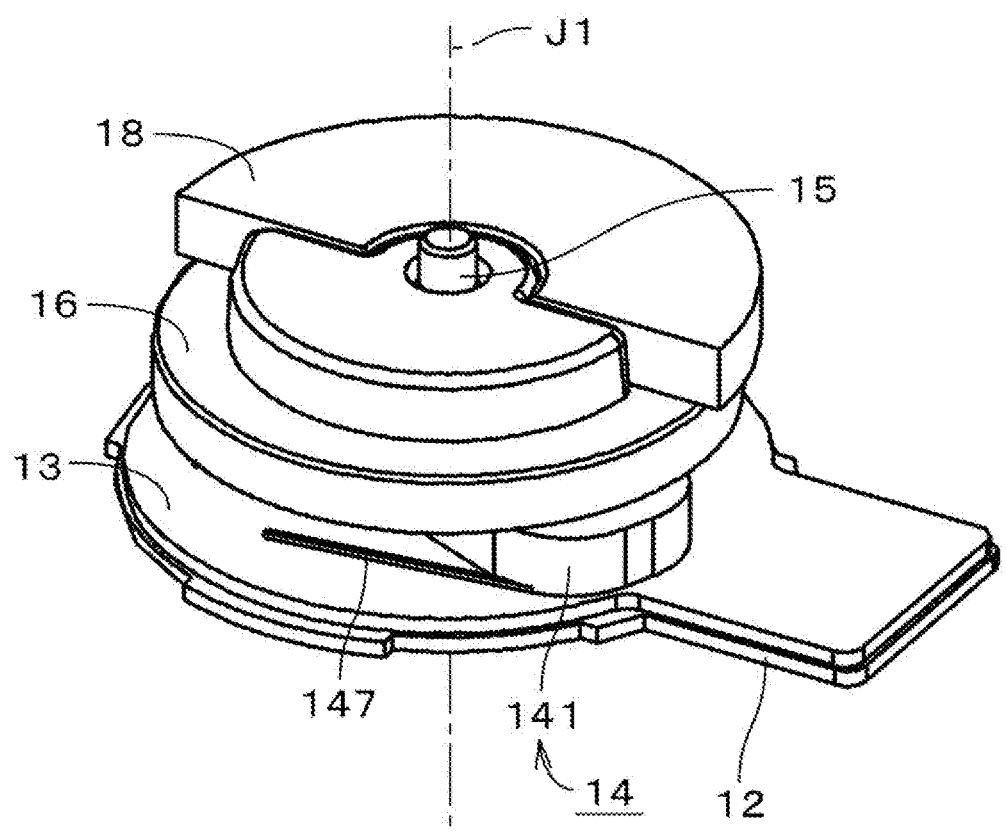
FIG. 3 is a perspective view of a rotating portion and a stationary portion of the vibration motor.
Figure 4:
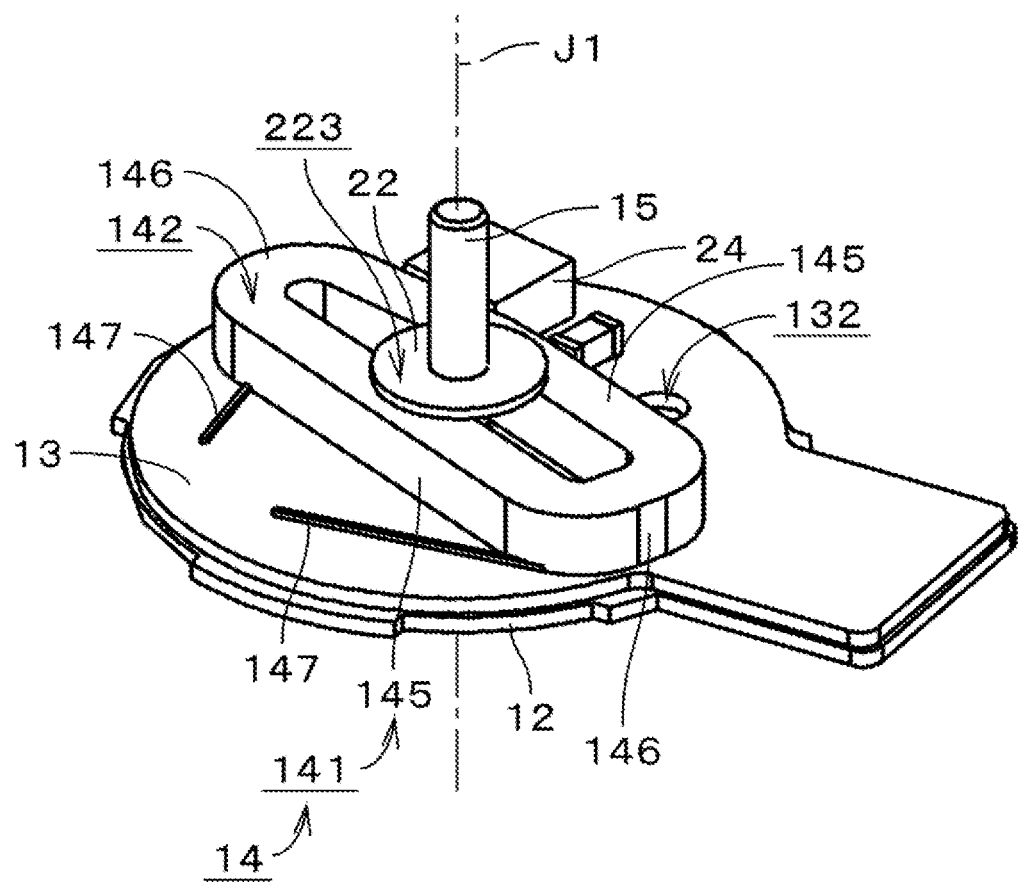
FIG. 4 is a perspective view of the stationary portion.
Figure 5:
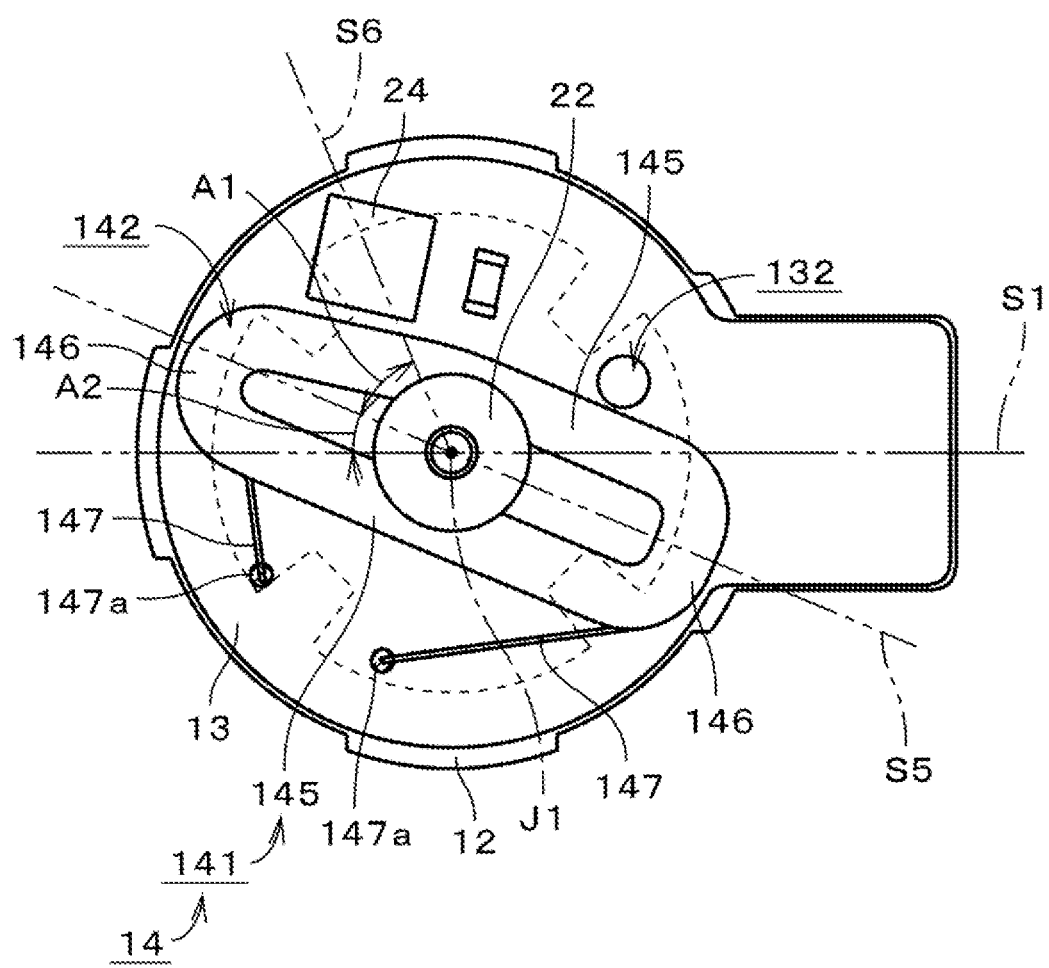
FIG. 5 is a plan view of the stationary portion.
Figure 6:
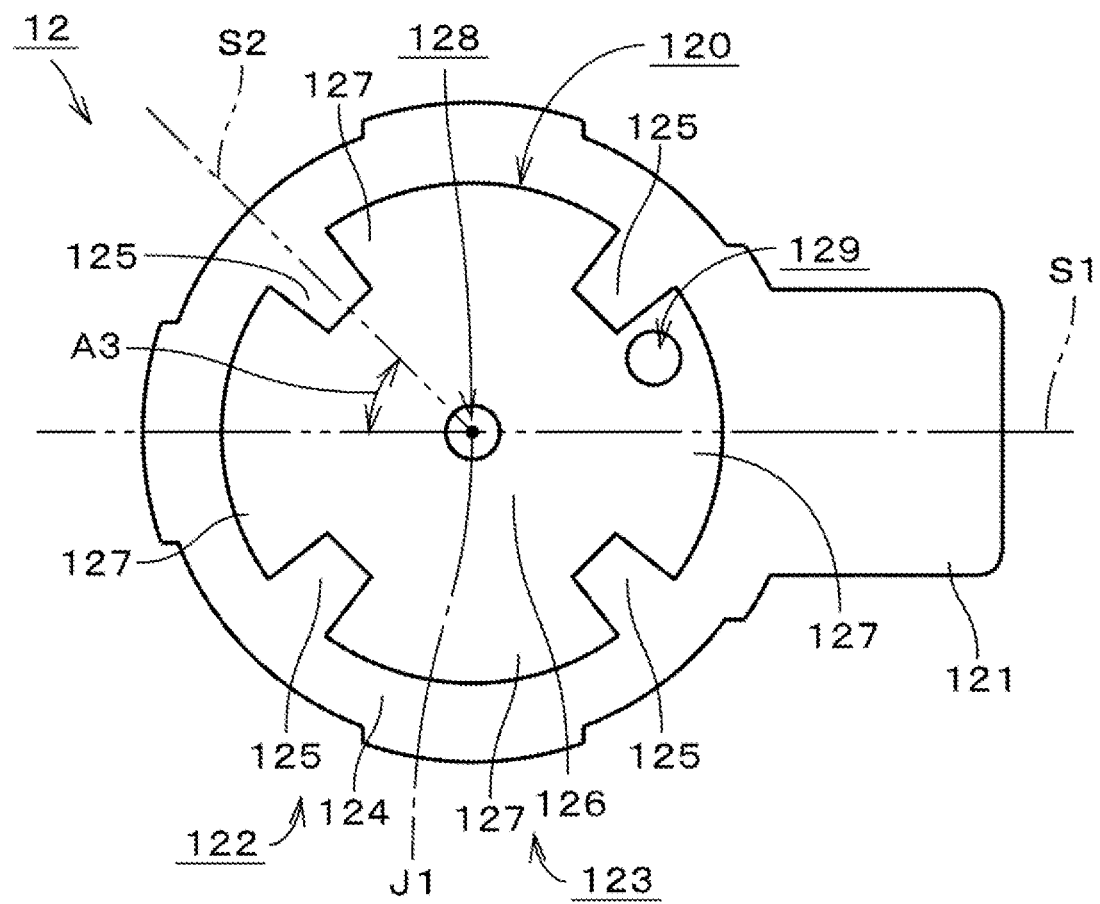
FIG. 6 is a plan view of a base portion of the vibration motor.

FIG. 1 is a perspective view illustrating the external appearance of the vibration motor 1 according to a first preferred embodiment of the present invention. FIG. 2 is a vertical sectional view of the vibration motor 1. Parallel oblique lines are omitted for sections of details in FIG. 2. In addition, in FIG. 2, features on the far side of the section of the vibration motor 1 are also depicted. FIG. 3 is a perspective view of a rotating portion and a stationary portion of the vibration motor 1. FIG. 4 is a perspective view of the stationary portion of the vibration motor 1. FIG. 5 is a plan view of the stationary portion of the vibration motor 1. FIG. 6 is a plan view of a base portion 12.

The vibration motor 1 is a brushless motor in the shape of a coin. The vibration motor 1 is used as, for example, a silent notification device in a mobile communication apparatus, such as a cellular phone. In other words, the vibration motor 1 is included in the mobile communication apparatus, for example.

The vibration motor 1 includes a cover portion 11 and the base portion 12. The cover portion 11 is substantially in the shape of a covered cylinder. The base portion 12 is substantially in the shape of a plate. The base portion 12 is arranged to extend perpendicularly to the central axis J1, which extends in the vertical direction. The cover portion 11 is fixed to an outer edge portion of the base portion 12. The base portion 12 is arranged to close a lower opening of the cover portion 11. The cover portion 11 is made of a metal. The base portion 12 is also made of a metal. The cover portion 11 and the base portion 12 are connected to each other through, for example, welding. The base portion 12 is arranged to have a thickness in the range of, for example, about 0.1 mm to about 0.15 mm.

The vibration motor 1 further includes a circuit board 13, a coil portion 14, a shaft 15, a rotor holder 16, a magnet portion 17, and an eccentric weight 18. The vibration motor 1 further includes a bearing portion 21 and a spacer 22. The base portion 12, the circuit board 13, the coil portion 14, the shaft 15, and the spacer 22 are included in the stationary portion. The bearing portion 21, the rotor holder 16, the magnet portion 17, and the eccentric weight 18 are included in the rotating portion. FIG. 3 illustrates the vibration motor 1 with the cover portion 11 removed therefrom. Each of FIGS. 4 and 5 illustrates the vibration motor 1 with the cover portion 11 and the rotating portion removed therefrom.

The base portion 12 includes a base projecting portion 121, a base magnetic portion 122, and a base nonmagnetic portion 123. The base magnetic portion 122 is made of a magnetic metal. The base magnetic portion 122 is made of, for example, iron. The base nonmagnetic portion 123 is made of a nonmagnetic metal. The base nonmagnetic portion 123 is made of, for example, an austenitic stainless steel.

As illustrated in FIG. 6, the base magnetic portion 122 is substantially in the shape of an annular plate. The base nonmagnetic portion 123 is arranged radially inside of the base magnetic portion 122. The base nonmagnetic portion 123 is fixed to an edge portion of the base magnetic portion 122. The base nonmagnetic portion 123 is arranged to extend from the edge portion of the base magnetic portion 122 substantially perpendicularly to the vertical direction. The base projecting portion 121 is arranged to extend from the base magnetic portion 122 in a direction substantially perpendicular to the central axis J1. The base projecting portion 121 is arranged to project radially outward from the cover portion 11. In the preferred embodiment illustrated in FIG. 6, the base projecting portion 121 and the base magnetic portion 122 are defined by a single continuous monolithic member. The base projecting portion 121 is also made of a magnetic metal.

The base magnetic portion 122 includes a magnetic outer circumferential portion 124 and a plurality of magnetic element portions 125. In the preferred embodiment illustrated in FIG. 6, the base magnetic portion 122 includes four magnetic element portions 125. The magnetic outer circumferential portion 124 is substantially annular. In more detail, the magnetic outer circumferential portion 124 is substantially in the shape of a circular ring, and is centered on the central axis J1. The magnetic outer circumferential portion 124 is arranged to surround an outer periphery of the base nonmagnetic portion 123.

Each of the magnetic element portions 125 is defined integrally with the magnetic outer circumferential portion 124. Each of the magnetic element portions 125 is arranged to project radially inward from the magnetic outer circumferential portion 124. Each magnetic element portion 125 is a magnetic projecting portion arranged to project from an inner circumferential edge of the magnetic outer circumferential portion 124 substantially perpendicularly to the vertical direction toward the central axis J1. Each of the magnetic element portions 125 is arranged to have the same shape. The circumferential width of each of the magnetic element portions 125 is arranged to decrease in a radially inward direction.

The magnetic element portions 125 are arranged in the circumferential direction, and are arranged at positions opposed to the magnet portion 17 in the vertical direction. The magnetic element portions 125 are arranged at equal angular intervals in the circumferential direction. In the preferred embodiment illustrated in FIG. 6, the four magnetic element portions 125 are arranged at intervals of 90 degrees. In other words, in a plan view, an angle defined between a straight line that joins a circumferential middle of each magnetic element portion 125 and the central axis J1, and a straight line that joins a circumferential middle of the magnetic element portion 125 adjacent thereto and the central axis J1, is 90 degrees.

The base nonmagnetic portion 123 includes a nonmagnetic central portion 126 and a plurality of nonmagnetic element portions 127. In the preferred embodiment illustrated in FIG. 6, the base nonmagnetic portion 123 includes four nonmagnetic element portions 127. The nonmagnetic central portion 126 is substantially in the shape of a disk, and is centered on the central axis J1. A base central through hole 128, which passes through the base portion 12 in the vertical direction, is defined in a central portion of the nonmagnetic central portion 126. The base central through hole 128 is, for example, circular in a plan view.

Each of the nonmagnetic element portions 127 is defined integrally with the nonmagnetic central portion 126. Each of the nonmagnetic element portions 127 is arranged to project radially outward from the nonmagnetic central portion 126. Each nonmagnetic element portion 127 is a nonmagnetic projecting portion arranged to project from an outer circumferential edge of the nonmagnetic central portion 126 substantially perpendicularly to the vertical direction. Each of the nonmagnetic element portions 127 is arranged to have the same shape. The nonmagnetic element portions 127 are arranged to extend from the nonmagnetic central portion 126 in a radial manner with the central axis J1 as a center. The circumferential width of each of the nonmagnetic element portions 127 is arranged to increase in a radially outward direction.

The nonmagnetic element portions 127 are arranged in the circumferential direction, and are arranged at positions opposed to the magnet portion 17 in the vertical direction. The nonmagnetic element portions 127 are arranged at equal angular intervals in the circumferential direction. In the preferred embodiment illustrated in FIG. 6, the four nonmagnetic element portions 127 are arranged at intervals of 90 degrees. In other words, in a plan view, an angle defined between a straight line that joins a circumferential middle of each nonmagnetic element portion 127 and the central axis J1, and a straight line that joins a circumferential middle of the nonmagnetic element portion 127 adjacent thereto and the central axis J1, is 90 degrees.

The nonmagnetic element portions 127 are arranged to alternate with the magnetic element portions 125 in the circumferential direction. The circumferential width of each magnetic element portion 125 is smaller than the circumferential width of each nonmagnetic element portion 127 at any radial position. The magnetic element portions 125 and the nonmagnetic element portions 127 are arranged at equal angular intervals in the circumferential direction. In the preferred embodiment illustrated in FIG. 6, the four magnetic element portions 125 and the four nonmagnetic element portions 127 are arranged at intervals of 45 degrees. In other words, in a plan view, an angle defined between the straight line that joins the circumferential middle of each magnetic element portion 125 and the central axis J1, and the straight line that joins the circumferential middle of the nonmagnetic element portion 127 adjacent to the magnetic element portion 125 and the central axis J1, is 45 degrees.

In FIG. 6, a first plane S1, which is an imaginary plane including the central axis J1 and a circumferential middle of the base projecting portion 121, is represented by a chain double-dashed line. In addition, a second plane S2, which is an imaginary plane including the central axis J1 and the circumferential middle of one of the magnetic element portions 125 that is closest to the first plane S1 in the circumferential direction of all the magnetic element portions 125, is also represented by a chain double-dashed line. In FIG. 6, the magnetic element portion 125 in the upper left of the figure is regarded as this one of the magnetic element portions 125. An angle A3 defined between the first plane S1 and the second plane S2 is, for example, 45 degrees.

The base magnetic portion 122 includes a first boundary portion 122a, which is an area where the base magnetic portion 122 is in contact with the base nonmagnetic portion 123. The base nonmagnetic portion 123 includes a second boundary portion 123a, which is an area where the base nonmagnetic portion 123 is in contact with the base magnetic portion 122. An area where the first boundary portion 122a and the second boundary portion 123a are in contact with each other is defined as a boundary portion 120. In more detail, at the boundary portion 120, the base magnetic portion 122 and the base nonmagnetic portion 123 are arranged to be in contact with each other substantially over the entire length thereof. A side edge of each magnetic element portion 125 is arranged to be in contact with a side edge of an adjacent one of the nonmagnetic element portions 127, each side edge extending substantially in a radial direction. An inner edge of each magnetic element portion 125, the inner edge extending substantially in the circumferential direction, is arranged to be in contact with an outer circumferential edge of the nonmagnetic central portion 126. An outer edge of each nonmagnetic element portion 127, the outer edge extending substantially in the circumferential direction, is arranged to be in contact with the inner circumferential edge of the magnetic outer circumferential portion 124.

The base magnetic portion 122 and the base nonmagnetic portion 123 are welded to each other at the boundary portion 120 between the base magnetic portion 122 and the base nonmagnetic portion 123, and are thus fixed to each other. The base magnetic portion 122 and the base nonmagnetic portion 123 are welded to each other at, for example, a plurality of separate positions along the boundary portion 120. Note that the base magnetic portion 122 and the base nonmagnetic portion 123 may alternatively be welded to each other at the boundary portion 120 substantially over the entire length thereof. Also note that the base magnetic portion 122 and the base nonmagnetic portion 123 may not necessarily be fixed to each other through welding, but may alternatively be fixed to each other through, for example, adhesion or press fitting.

The base magnetic portion 122 and the base nonmagnetic portion 123 do not overlap with each other at any position outside of the boundary portion 120, which is the area where the first boundary portion 122a and the second boundary portion 123a are in contact with each other, when viewed in the vertical direction. In other words, no portion of the base magnetic portion 122 is arranged over or under the base nonmagnetic portion 123 at any position outside of the boundary portion 120.

Figure 7:
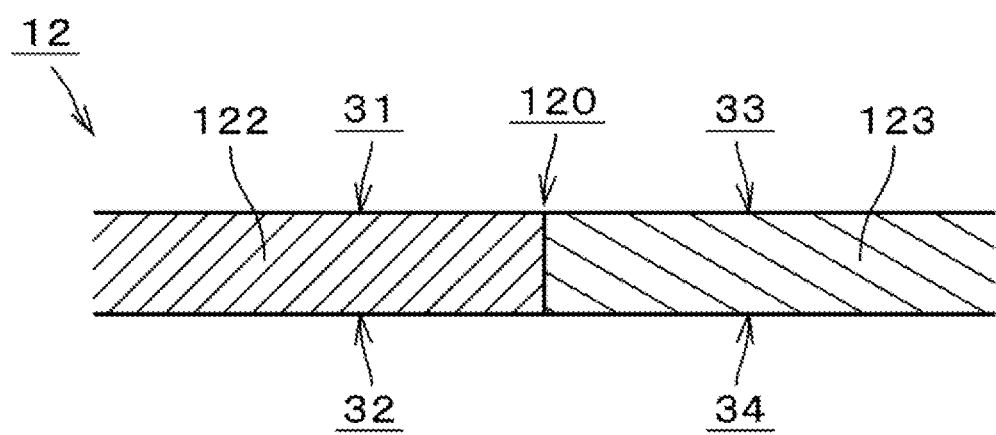
FIG. 7 is a sectional view of a boundary portion between a base magnetic portion and a base nonmagnetic portion according to the first preferred embodiment of the present invention.

FIG. 7 is a sectional view illustrating the boundary portion 120 between the base magnetic portion 122 and the base nonmagnetic portion 123 in an enlarged form. In FIG. 7, a section of a portion of the boundary portion 120 of the base portion 12 at which the base magnetic portion 122 and the base nonmagnetic portion 123 are not welded to each other is shown. Except where the base magnetic portion 122 and the base nonmagnetic portion 123 are welded to each other, the boundary portion 120 has a section similar to the section illustrated in FIG. 7.

In the embodiment illustrated in FIG. 7, the base magnetic portion 122 and the base nonmagnetic portion 123 do not overlap with each other even at the boundary portion 120 when viewed in the vertical direction. In more detail, the base magnetic portion 122 and the base nonmagnetic portion 123 do not overlap with each other when viewed in the vertical direction where the base magnetic portion 122 and the base nonmagnetic portion 123 are not welded to each other in the boundary portion 120. Note that, where the base magnetic portion 122 and the base nonmagnetic portion 123 are welded to each other, portions of both the base magnetic portion 122 and the base nonmagnetic portion 123 are mixed as a result of fusion, which may make it unclear whether the base magnetic portion 122 and the base nonmagnetic portion 123 overlap with each other when viewed in the vertical direction. A side surface of the edge portion of the base magnetic portion 122 is arranged to be parallel or substantially parallel to the vertical direction, and a side surface of an edge portion of the base nonmagnetic portion 123 is also arranged to be parallel or substantially parallel to the vertical direction. The side surface of the edge portion of the base magnetic portion 122 and the side surface of the edge portion of the base nonmagnetic portion 123 are arranged opposite to and in contact with each other in a direction perpendicular to the vertical direction.

The base magnetic portion 122 is arranged to have a vertical thickness substantially equal to the vertical thickness of the base nonmagnetic portion 123. Regarding an upper surface of the base portion 12, an upper surface 31 of the base magnetic portion 122 and an upper surface 33 of the base nonmagnetic portion 123 are arranged at the same vertical level substantially over the entire upper surface of the base portion 12. In addition, regarding a lower surface of the base portion 12, a lower surface 32 of the base magnetic portion 122 and a lower surface 34 of the base nonmagnetic portion 123 are arranged at the same vertical level substantially over the entire lower surface of the base portion 12.

The circuit board 13 is arranged on the base portion 12. A central portion of the circuit board 13 includes a board central through hole 131 through which the shaft 15 is inserted. The board central through hole 131 is, for example, circular in a plan view. The circuit board 13 is arranged to cover substantially the entire upper surface of the base portion 12 except an outer edge portion of the upper surface of the base portion 12. Over an area where the upper surface of the base portion 12 is covered with the circuit board 13, the upper surface 31 of the base magnetic portion 122 and the upper surface 33 of the base nonmagnetic portion 123 are arranged at the same vertical level as mentioned above. The circuit board 13 is fixed to the base portion 12 through an adhesive, for example. Note that the concept of "adhesive" in the present preferred embodiment includes a double-sided tape, glue, and so on. The circuit board 13 is a flexible printed circuit (FPC) board, which has flexibility. An electronic component 24 is attached onto the circuit board 13. The electronic component 24 is arranged to detect rotation of the magnet portion 17, for example. The electronic component 24 is, for example, a Hall sensor. The electronic component 24 may alternatively be a capacitor, a resistor, or any of various other components.

The coil portion 14 is attached onto the circuit board 13. The coil portion 14 is electrically connected to the circuit board 13. In the preferred embodiment illustrated in FIGS. 2 to 5, the coil portion 14 is defined by a single annular coil 141. The shaft 15 is arranged inside of the coil 141. The coil 141 is fixed onto the circuit board 13 through an adhesive, for example.

The coil 141 is, for example, substantially in the shape of a rectangular ring, elongated in one radial direction in a plan view. The coil 141 includes two long side portions 145 and two short side portions 146. Each of the two long side portions 145 is arranged to extend in a longitudinal direction of the coil 141 with the shaft 15 arranged between the two long side portions 145. The two short side portions 146 are arranged to join both end portions of the two long side portions 145. Each of the two short side portions 146, which is a radially outer end portion of the coil 141, is arranged above the magnetic outer circumferential portion 124 of the base portion 12, and is arranged to overlap with the magnetic outer circumferential portion 124 when viewed in the vertical direction. In addition, the radially outer end portion of the coil 141 is arranged radially outward of an outer circumferential edge of the magnet portion 17. Note that the radially outer end portion of the coil 141 may alternatively be arranged radially inward of the outer circumferential edge of the magnet portion 17.

In the preferred embodiment illustrated in FIG. 5, the width of an interspace between the two long side portions 145 is arranged to be smaller on one side (i.e., the left side in the figure) of a longitudinal middle of the coil 141 than on the other side (i.e., the right side in the figure) of the longitudinal middle. The width of the interspace between the two long side portions 145 refers to the distance between the two long side portions 145 as measured in a direction perpendicular to the longitudinal direction of the coil 141. In more detail, on the left side of the longitudinal middle of the coil 141 in FIG. 5, the width of the interspace between the long side portions 145 is arranged to gradually decrease with increasing distance from the longitudinal middle. In addition, on the right side of the longitudinal middle of the coil 141 in FIG. 5, the width of the interspace between the long side portions 145 is arranged to be substantially uniform regardless of the distance from the longitudinal middle. Therefore, the short side portion 146 on the left side of the longitudinal middle of the coil 141 is shorter than the short side portion 146 on the right side of the longitudinal middle of the coil 141.

In FIG. 5, a coil middle plane S5, which is an imaginary plane parallel to the longitudinal direction of the coil 141 and including the central axis J1, is represented by a chain double-dashed line. An angle A2 defined between the coil middle plane S5 and the first plane S1 is, for example, 22.5 degrees. Each of the two long side portions 145 of the coil 141 extends along the coil middle plane S5. In more detail, the long side portion 145 on the lower side in FIG. 5 is parallel to the coil middle plane S5 substantially over the entire length thereof. The long side portion 145 on the upper side in FIG. 5 is parallel to the coil middle plane S5 on the right side of the longitudinal middle of the coil 141. In addition, on the left side of the longitudinal middle of the coil 141, the long side portion 145 on the upper side is arranged to gradually approach the coil middle plane S5 with increasing distance from the longitudinal middle.

On the left side in FIG. 5, which is the aforementioned one side, of the longitudinal middle of the coil 141, the electronic component 24 is attached onto the circuit board 13 at a position near the long side portion 145 on the upper side in FIG. 5, which is one of the long side portions 145 of the coil 141. The electronic component 24 is arranged adjacent to the aforementioned long side portion 145 and outside of the coil 141. In the preferred embodiment illustrated in FIG. 5, the electronic component 24 is arranged adjacent to the coil 141 on the upper side of the long side portion 145 on the upper side in the figure.

An angle A1 defined between a component middle plane S6, which is an imaginary plane passing through the electronic component 24 and including the central axis J1, and the coil middle plane S5, which passes through the short side portions 146 of the coil 141 and includes the central axis J1, is, for example, 45 degrees. Each short side portion 146 is a longitudinal end portion of the coil 141. In more detail, the coil middle plane S5 includes the central axis J1 and a circumferential middle of one of the short side portions 146 which is closer to the base projecting portion 121. Meanwhile, the component middle plane S6 includes the central axis J1 and a circumferential middle of the electronic component 24. The aforementioned angle A1 may not necessarily be precisely 45 degrees, but may be practically 45 degrees. Note that the aforementioned angle A1 may be appropriately changed to an angle other than 45 degrees. The arrangement of the coil 141 and the electronic component 24 may be modified appropriately. For example, the coil 141 and the electronic component 24 may be arranged at positions rotated 45 degrees in a counterclockwise direction about the central axis J1 from the respective positions thereof illustrated in FIG. 5.

Lead wires 147 extending from the coil 141 are connected to the circuit board 13 on the opposite side of the coil 141 with respect to the electronic component 24. In other words, each lead wire 147 is connected to the circuit board 13 at a position closer not to the long side portion 145 near which the electronic component 24 is arranged but to the other long side portion 145. In the preferred embodiment illustrated in FIG. 5, each lead wire 147 is connected to the circuit board 13 at a position near the coil 141 on the lower side of the long side portion 145 on the lower side in the figure. In FIG. 5, a connection portion 147a at which each lead wire 147 is connected to the circuit board 13 is hatched with parallel oblique lines. The lead wire 147 is connected to the circuit board 13 through, for example, soldering. Note that the lead wire 147 may alternatively be connected to the circuit board 13 by a method other than soldering. Also note that the connection portion 147a may not necessarily be arranged on the opposite side of the coil 141 with respect to the electronic component 24, but may alternatively be arranged at another appropriate position.

The shaft 15 is arranged to have the central axis J1 as a center thereof. A lower end of the shaft 15 is fixed to the base portion 12. Specifically, the lower end of the shaft 15 is fixed in the base central through hole 128. For example, the lower end of the shaft 15 is press fitted in the base central through hole 128, and is welded to the base nonmagnetic portion 123. A lower end surface of the shaft 15 is arranged at the same vertical level as that of a portion of the lower surface of the base portion 12 which is near and around the base central through hole 128.

An upper surface of an entire portion of the base portion 12 which lies between the shaft 15 and an inner circumferential edge of the coil 141 in a plan view is arranged at the same vertical level. Moreover, an upper surface of an entire portion of the base portion 12 which lies between the shaft 15 and the magnetic element portions 125 and the nonmagnetic element portions 127 is arranged at the same vertical level. In other words, the upper surface 33 of the nonmagnetic central portion 126, which defines a portion of the upper surface of the base portion 12 between the base central through hole 128 and the magnetic element portions 125 and the nonmagnetic element portions 127, is a flat surface perpendicular to the vertical direction substantially in its entirety.

The shaft 15 is arranged to project upward from the base portion 12 along the central axis J1. An upper end of the shaft 15 is fixed to a central portion of a top cover portion of the cover portion 11. The shaft 15 is fixed to the cover portion 11 through, for example, welding and press fitting. The shaft 15 is arranged radially opposite to the coil 141 with a gap therebetween. In other words, the coil portion 14 is arranged radially opposite to the shaft 15 with the gap therebetween. No member of the vibration motor 1 is arranged in this gap. The shaft 15 is made of, for example, a metal. Note that the shaft 15 may alternatively be made of another material.

The base portion 12 includes a base peripheral through hole 129, which passes through the base portion 12 in the vertical direction, at a position away from the shaft 15. In the preferred embodiment illustrated in FIG. 6, the base peripheral through hole 129 is defined in the base nonmagnetic portion 123, the outer periphery of which is surrounded by the base magnetic portion 122. The circuit board 13 includes a board peripheral through hole 132, which is arranged to overlap with the base peripheral through hole 129 of the base portion 12 when viewed in the vertical direction. The base peripheral through hole 129 is, for example, in the shape of a circle or polygon in a plan view. The board peripheral through hole 132 is also, for example, in the shape of a circle or polygon in a plan view. The base peripheral through hole 129 and the board peripheral through hole 132 are preferably arranged to have the same shape.

Each of the base peripheral through hole 129 and the board peripheral through hole 132 is used when assembling the vibration motor 1. Specifically, a jig in the shape of a pin is inserted through the base peripheral through hole 129 when the circuit board 13 is fixed to the base portion 12. The shaft 15 is fixed in the base central through hole 128 beforehand. Then, the aforementioned jig is inserted through the board peripheral through hole 132, while the shaft 15 is inserted through the board central through hole 131 of the circuit board 13. Thereafter, the circuit board 13 is fixed to the upper surface of the base portion 12 through the adhesive or the like, and the jig is removed.

As described above, in the vibration motor 1, at the position away from the shaft 15, the base peripheral through hole 129 is defined in the base portion 12, and the board peripheral through hole 132, which overlaps with the base peripheral through hole 129 when viewed in the vertical direction, is defined in the circuit board 13. Then, the shaft 15 and the jig are inserted through the board central through hole 131 and the board peripheral through hole 132, respectively, of the circuit board 13 to improve positional precision with which the circuit board 13 is attached to the base portion 12.

The base peripheral through hole 129 is defined in the base nonmagnetic portion 123, the outer periphery of which is surrounded by the base magnetic portion 122, as described above. The base peripheral through hole 129 is thus defined at a position away from the outer edge portion of the base portion 12, and this contributes to limiting a reduction in strength of the base portion 12 caused by the base peripheral through hole 129.

The spacer 22 is a substantially annular plate-shaped member including a through hole defined in a center thereof. In the preferred embodiment illustrated in FIGS. 4 and 5, the spacer 22 is in the shape of a circular ring, and is centered on the central axis J1. Note that the spacer 22 may alternatively be, for example, in the shape of the letter "C", that is, a circular ring with one circumferential portion omitted. The shaft 15 is inserted through the through hole of the spacer 22. The spacer 22 is attached to the shaft 15 through, for example, press fitting. The spacer 22 is arranged above the coil portion 14, and is fixed to the shaft 15. The spacer 22 is made of, for example, a resin. Note that the spacer 22 may alternatively be made of another material. Also note that the spacer 22 may alternatively be attached to the shaft 15 by a method other than press fitting.

A lower surface 221 of the spacer 22 is arranged opposite to an upper surface 142 of the coil 141 of the coil portion 14 in the vertical direction. In the preferred embodiment illustrated in FIG. 4, the lower surface 221 of the spacer 22 is arranged to be in contact with the upper surface 142 of the coil 141 of the coil portion 14.

The bearing portion 21 is an annular member including a through hole defined in a center thereof. In the preferred embodiment illustrated in FIG. 2, the bearing portion 21 includes a substantially cylindrical portion centered on the central axis J1, and a portion substantially in the shape of a semicircular disk and arranged to project to the left in FIG. 2 from an upper portion of the substantially cylindrical portion. The shaft 15 is inserted through the through hole of the bearing portion 21. The bearing portion 21 is attached to the shaft 15 to be rotatable with respect to the shaft 15 above the coil 141 of the coil portion 14. In addition, the bearing portion 21 is arranged above the spacer 22. In other words, the spacer 22 is attached to the shaft 15 between the bearing portion 21 and the coil 141 of the coil portion 14.

As illustrated in FIG. 2, an upper surface 223 of the spacer 22 is arranged to be in contact with a lower surface 211 of the bearing portion 21. In the preferred embodiment illustrated in FIG. 2, an outer edge of the upper surface 223 of the spacer 22 is arranged to substantially coincide with an outer edge of the lower surface 211 of the bearing portion 21 in its entirety. In other words, the upper surface 223 of the spacer 22 is arranged to have an outside diameter substantially equal to the outside diameter of the lower surface 211 of the bearing portion 21. The bearing portion 21 is a plain bearing. Note that the bearing portion 21 may alternatively be a bearing of another type. The bearing portion 21 is made of, for example, a sintered metal. Preferably, the bearing portion 21 is impregnated with a lubricating oil. Note that the bearing portion 21 may alternatively be made of another material.

The rotor holder 16 is a member substantially in the shape of a covered cylinder. The rotor holder 16 is attached to the bearing portion 21. In more detail, an inner circumferential portion of a top cover portion of the rotor holder 16 is fixed to, for example, an outer circumferential portion of the bearing portion 21. The rotor holder 16 is thus supported by the bearing portion 21 to be rotatable with respect to the shaft 15. The rotor holder 16 is made of, for example, a metal.

The magnet portion 17 is a member substantially in the shape of a circular ring, and is centered on the central axis J1. The magnet portion 17 is attached to the rotor holder 16. In more detail, an upper surface of the magnet portion 17, which is substantially cylindrical, is attached to a lower surface of the top cover portion of the rotor holder 16. The magnet portion 17 is arranged above the coil 141 of the coil portion 14, and is arranged opposite to the coil 141 in the vertical direction with a gap therebetween. The magnet portion 17 is arranged around the bearing portion 21. The bearing portion 21 is arranged radially inside of the magnet portion 17. An inner circumferential surface of the magnet portion 17 is fixed to an outer circumferential surface of the bearing portion 21.

In the preferred embodiment illustrated in FIG. 2, the eccentric weight 18 is arranged to have a shape corresponding to that of a right half of a substantially cylindrical member. The eccentric weight 18 is substantially semicircular in a plan view. The eccentric weight 18 is attached to the rotor holder 16. In more detail, a lower surface of the eccentric weight 18 is attached to an upper surface of the top cover portion of the rotor holder 16 through, for example, an adhesive. The center of gravity of the eccentric weight 18 is radially away from the central axis J1.

The cover portion 11 is arranged to cover upper and lateral sides of the rotor holder 16 and the eccentric weight 18. The cover portion 11 may not necessarily cover the rotor holder 16 and the eccentric weight 18 in their entirety. The cover portion 11 may include an opening or the like defined therein, as long as the cover portion 11 is arranged to cover, at least in part, the rotor holder 16 and the eccentric weight 18. The cover portion 11 is fixed to the upper end of the shaft 15, and is also fixed to the outer edge portion of the base portion 12, as described above.

In the vibration motor 1, an electric current is supplied to the coil 141 of the coil portion 14 through the circuit board 13 to generate a torque between the coil 141 and the magnet portion 17. The rotating portion, that is, a combination of the bearing portion 21, the rotor holder 16, the magnet portion 17, and the eccentric weight 18, is thus caused to rotate around the shaft 15. In the coil portion 14, a portion of the coil 141 which extends substantially in a radial direction is a torque generating portion that causes the torque to be generated between the magnet portion 17 and the coil 141. In the preferred embodiment illustrated in FIGS. 4 and 5, each of the two long side portions 145 of the coil 141 is the torque generating portion. Since the center of gravity of the eccentric weight 18 is radially away from the central axis J1 as described above, the rotation of the eccentric weight 18 causes vibrations. If the supply of the electric current to the coil portion 14 is stopped, the rotation of the rotating portion stops. When the rotation of the rotating portion stops, a plurality of magnetic poles 171 of the magnet portion 17 stop at predetermined circumferential stop positions.

Figure 8:
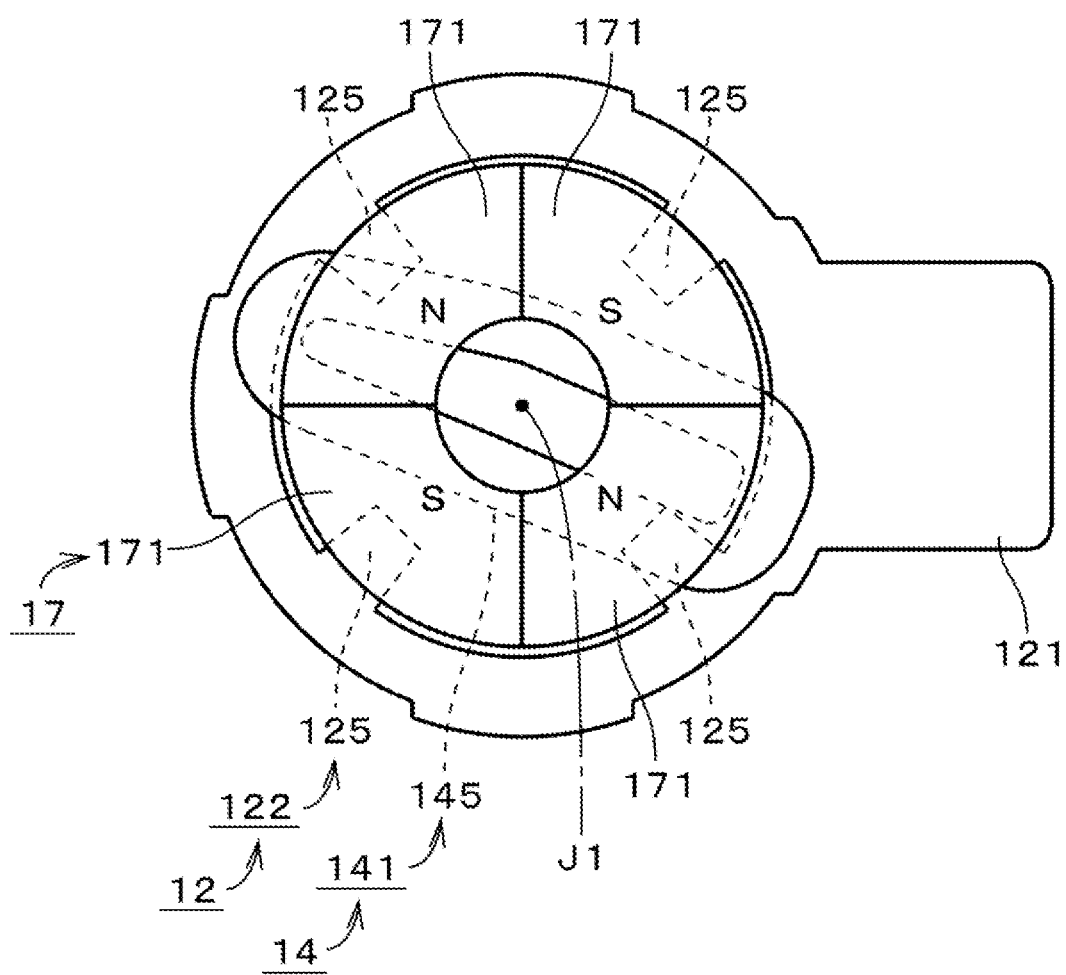
FIG. 8 is a plan view of a magnet portion, a coil portion, and the base portion according to the first preferred embodiment of the present invention.

FIG. 8 is a diagram illustrating an example stop position of the magnet portion 17. FIG. 8 is a plan view illustrating the magnet portion 17, the coil portion 14, and the base portion 12. In FIG. 8, for easier understanding of the positional relationships between the magnet portion 17, the coil portion 14, and the magnetic element portions 125 of the base portion 12, the other components, including the circuit board 13, are not shown.

The magnet portion 17 includes the plurality of magnetic poles 171. The number of magnetic poles 171 is, for example, a multiple of two. Preferably, the number of magnetic poles 171 is a multiple of four. In the preferred embodiment illustrated in FIG. 8, the magnet portion 17 includes four magnetic poles 171. That is, the magnet portion 17 includes two north poles and two south poles. The two north poles and the two south poles are arranged to alternate with each other in the circumferential direction. The magnetic poles 171 are arranged at equal angular intervals in the circumferential direction. In the preferred embodiment illustrated in FIG. 8, the four magnetic poles 171 are arranged at intervals of 90 degrees. In other words, in a plan view, an angle defined between a straight line that joins a circumferential middle of each magnetic pole 171 and the central axis J1, and a straight line that joins a circumferential middle of the magnetic pole 171 adjacent thereto and the central axis J1, is 90 degrees.

The number of magnetic element portions 125 of the base portion 12 is preferably equal to or smaller than the number of magnetic poles 171. In the preferred embodiment illustrated in FIG. 8, the number of magnetic element portions 125 is equal to the number of magnetic poles 171. As described above, the magnetic element portions 125 are arranged at equal angular intervals in the circumferential direction, and the magnetic poles 171 are also arranged at equal angular intervals in the circumferential direction. Therefore, in the preferred embodiment illustrated in FIG. 8, both the magnetic element portions 125 and the magnetic poles 171 are arranged at the same angular intervals of 90 degrees in the circumferential direction.

A radially inner end portion of each of the magnetic element portions 125 is arranged opposite to the magnet portion 17 in the vertical direction. The circumferential width of a portion of the magnetic element portion 125 which is opposed to the magnet portion 17 in the vertical direction is equal to or smaller than the circumferential width of each magnetic pole 171 of the magnet portion 17 at any radial position. In the preferred embodiment illustrated in FIG. 8, the circumferential width of the portion of the magnetic element portion 125 which is opposed to the magnet portion 17 in the vertical direction is smaller than the circumferential width of each magnetic pole 171 of the magnet portion 17 at any radial position.

In the vibration motor 1, once the supply of the electric current to the coil 141 of the coil portion 14 is stopped, cogging torque generated between the magnetic element portions 125 of the base magnetic portion 122 and the magnet portion 17 causes the rotating portion to stop with each of the magnetic poles 171 of the magnet portion 17 positioned over one of the magnetic element portions 125. In more detail, the rotating portion is caused to stop with the circumferential middle of each magnetic pole 171 positioned opposite to the circumferential middle of one of the magnetic element portions 125 in the vertical direction. In the preferred embodiment illustrated in FIG. 8, the circumferential middle of each of the four magnetic poles 171 coincides with the circumferential middle of a separate one of the four magnetic element portions 125 when viewed in the vertical direction.

As described above, the angle A3 defined between the first plane S1, which includes the central axis J1 and the circumferential middle of the base projecting portion 121, and the second plane S2, which includes the central axis J1 and the circumferential middle of the magnetic element portion 125, is 45 degrees. In addition, the angle A2 defined between the first plane S1 and the coil middle plane S5 is 22.5 degrees. Therefore, an angle defined between the coil middle plane S5 and the second plane S2 is 22.5 degrees. Therefore, when the rotating portion is in a stopped state, the circumferential middle of the magnetic pole 171 that overlaps with the magnetic element portion 125 near the coil middle plane S5 when viewed in the vertical direction is displaced from the coil middle plane S5 in the circumferential direction by 22.5 degrees.

In the coil 141, each of the two long side portions 145, which is the torque generating portion that causes a torque to rotate the rotating portion to be generated between the magnet portion 17 and the coil 141, extends along the coil middle plane S5 as described above. This allows the circumferential middle of each magnetic pole 171 of the magnet portion 17 to be displaced from each of the two long side portions 145 in the circumferential direction when the rotating portion is in the stopped state. In other words, each magnetic pole 171 is prevented from being positioned at a dead point, which would prohibit the rotating portion from starting rotating, when the rotating portion is in the stopped state. The angle defined between the coil middle plane S5 and the second plane S2 mentioned above is preferably 90 degrees divided by the number of magnetic poles 171.

As described above, the vibration motor 1 includes the base portion 12, the shaft 15, the circuit board 13, the coil portion 14, the bearing portion 21, the rotor holder 16, the magnet portion 17, the eccentric weight 18, and the cover portion 11. The base portion 12 is made of the metal. This contributes to reducing the thickness of the base portion 12, that is, reducing the vertical dimension of the vibration motor 1, while limiting a reduction in the strength of the base portion 12.

The base portion 12 includes the base magnetic portion 122 made of the magnetic metal, and the base nonmagnetic portion 123 made of the nonmagnetic metal. The base nonmagnetic portion 123 is fixed to the edge portion of the base magnetic portion 122, and extends from the edge portion of the base magnetic portion 122 perpendicularly to the vertical direction. The base magnetic portion 122 includes the magnetic element portions 125. The magnetic element portions 125 are arranged in the circumferential direction, and are arranged at the positions opposed to the magnet portion 17 in the vertical direction. The base nonmagnetic portion 123 includes the nonmagnetic element portions 127. The nonmagnetic element portions 127 are arranged to alternate with the magnetic element portions 125 in the circumferential direction, and are arranged at the positions opposed to the magnet portion 17 in the vertical direction. This contributes to preventing each magnetic pole 171 of the magnet portion 17 from being positioned at any dead point when the rotating portion is in the stopped state as described above.

The base magnetic portion 122 and the base nonmagnetic portion 123 do not overlap with each other at any position outside of the boundary portion when viewed in the vertical direction. This allows the base portion 12 to have a smaller thickness than in the case where the base magnetic portion 122 and the base nonmagnetic portion 123 overlap with each other at a position other than the boundary portion 120. This leads to a reduced thickness of the vibration motor 1.

As illustrated in FIG. 7, in the base portion 12, the base magnetic portion 122 and the base nonmagnetic portion 123 do not overlap with each other even at the boundary portion 120 when viewed in the vertical direction. This contributes to a further reduction in the thickness of the base portion 12. This in turn leads to a further reduction in the thickness of the vibration motor 1. In addition, each of the side surface of the edge portion of the base magnetic portion 122 and the side surface of the edge portion of the base nonmagnetic portion 123 is arranged to be substantially parallel to the vertical direction, and this makes it easier to define the edge portion of the base magnetic portion 122 and the edge portion of the base nonmagnetic portion 123. This makes it easier to manufacture the base portion 12.

As described above, over the area where the upper surface of the base portion 12 is covered with the circuit board 13, the upper surface of the base magnetic portion 122 and the upper surface of the base nonmagnetic portion 123 are arranged at the same vertical level. This allows the circuit board 13 to be securely fixed to the upper surface of the base portion 12. In addition, the lower surface of the base magnetic portion 122 and the lower surface of the base nonmagnetic portion 123 are also arranged at the same vertical level. This prevents a projecting portion from being defined in the lower surface of the base portion 12. This contributes to a further reduction in the thickness of the base portion 12. This in turn leads to a further reduction in the thickness of the vibration motor 1.

Figure 9:
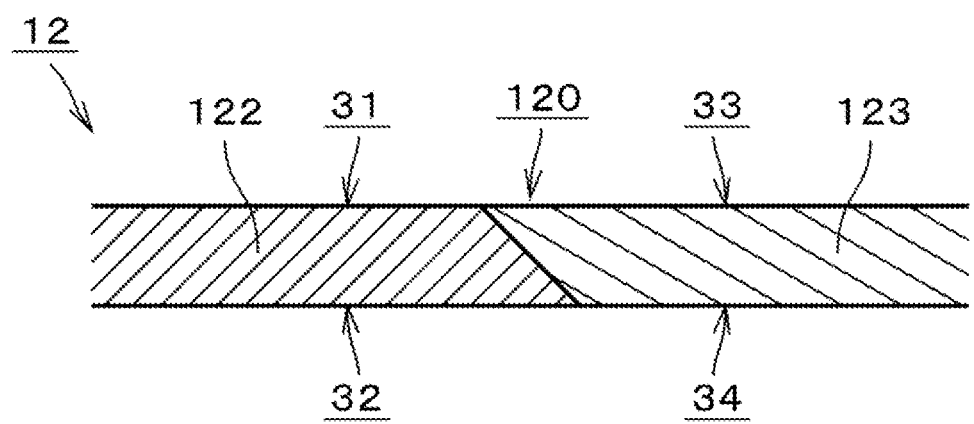
FIG. 9 is a sectional view of a boundary portion between a base magnetic portion and a base nonmagnetic portion according to a modification of the first preferred embodiment of the present invention.
Figure 10:
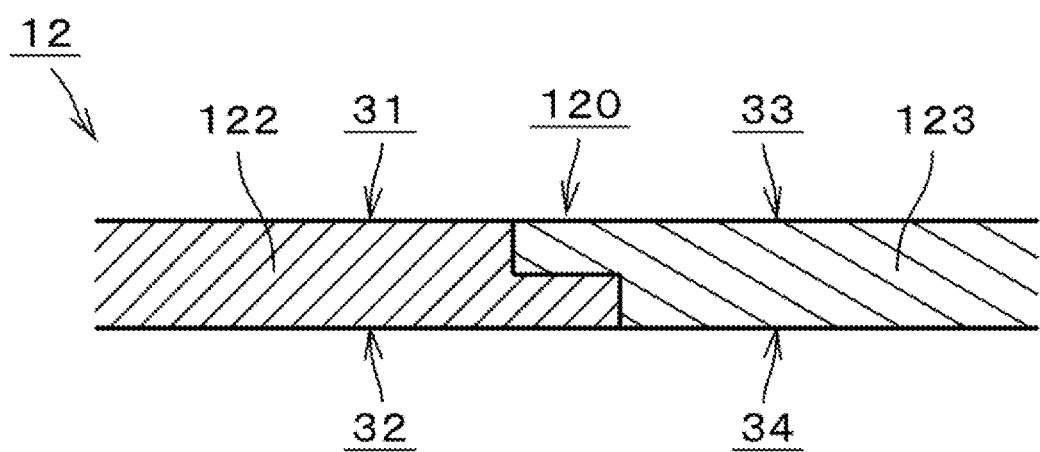
FIG. 10 is a sectional view of a boundary portion between a base magnetic portion and a base nonmagnetic portion according to a modification of the first preferred embodiment of the present invention.

In the vibration motor 1, the base magnetic portion 122 and the base nonmagnetic portion 123 may overlap with each other at the boundary portion 120 when viewed in the vertical direction. Each of FIGS. 9 and 10 is a sectional view illustrating a boundary portion 120 between a base magnetic portion 122 and a base nonmagnetic portion 123 of a base portion 12 according to a modification of the above-described preferred embodiment. In the modification illustrated in FIG. 9, each of an edge portion of the base magnetic portion 122 and an edge portion of the base nonmagnetic portion 123 includes an inclined surface which is inclined with respect to the vertical direction. At the boundary portion 120, the inclined surface of the base magnetic portion 122 and the inclined surface of the base nonmagnetic portion 123 overlap with each other when viewed in the vertical direction. An upper surface 31 of the base magnetic portion 122 is arranged at the same vertical level as that of an upper surface 33 of the base nonmagnetic portion 123. A lower surface 32 of the base magnetic portion 122 is arranged at the same vertical level as that of a lower surface 34 of the base nonmagnetic portion 123.

In the modification illustrated in FIG. 10, each of an edge portion of the base magnetic portion 122 and an edge portion of the base nonmagnetic portion 123 includes a shoulder portion having a thickness smaller than that of a neighboring portion thereof. At the boundary portion 120, the shoulder portion of the base magnetic portion 122 and the shoulder portion of the base nonmagnetic portion 123 overlap with each other when viewed in the vertical direction. An upper surface 31 of the base magnetic portion 122 is arranged at the same vertical level as that of an upper surface 33 of the base nonmagnetic portion 123. A lower surface 32 of the base magnetic portion 122 is arranged at the same vertical level as that of a lower surface 34 of the base nonmagnetic portion 123.

When the base magnetic portion 122 and the base nonmagnetic portion 123 are arranged to overlap with each other at the boundary portion 120 when viewed in the vertical direction as illustrated in each of FIGS. 9 and 10, an area of contact between the base magnetic portion 122 and the base nonmagnetic portion 123 at the boundary portion 120 is increased. This allows the base magnetic portion 122 and the base nonmagnetic portion 123 to be securely fixed to each other.

As illustrated in FIG. 6, the base magnetic portion 122 further includes the magnetic outer circumferential portion 124 surrounding the outer periphery of the base nonmagnetic portion 123. Each of the magnetic element portions 125 is arranged to project radially inward from the magnetic outer circumferential portion 124. The base nonmagnetic portion 123 further includes the nonmagnetic central portion 126, to which the lower end of the shaft 15 is fixed. Each of the nonmagnetic element portions 127 is arranged to project radially outward from the nonmagnetic central portion 126. This structure of the base portion 12 allows the magnetic element portions 125 and the nonmagnetic element portions 127 to be easily defined. This in turn makes it easy to manufacture the base portion 12.

As described above, in the base magnetic portion 122, the radially inner end portion of each of the magnetic element portions 125 is arranged opposite to the magnet portion 17 in the vertical direction. This contributes to increasing the cogging torque generated between the magnetic element portion 125 and the magnet portion 17. This makes it easier to prevent each magnetic pole 171 of the magnet portion 17 from being positioned at any dead point when the rotating portion is in the stopped state.

In addition, the circumferential width of the portion of each magnetic element portion 125 which is opposed to the magnet portion 17 in the vertical direction is equal to or smaller than the circumferential width of each magnetic pole 171 of the magnet portion 17 at any radial position. This contributes to preventing a magnetic force from acting between each magnetic element portion 125 and any magnetic pole 171 adjacent to the magnetic pole 171 positioned over the magnetic element portion 125. This makes it easier to prevent each magnetic pole 171 of the magnet portion 17 from being positioned at any dead point when the rotating portion is in the stopped state.

Further, the circumferential width of each of the magnetic element portions 125 is arranged to decrease in the radially inward direction. This makes it easier to define the magnetic element portions 125 when the base magnetic portion 122 is manufactured. This in turn makes it easier to manufacture the base portion 12.

As described above, the coil portion 14 is defined by the single annular coil 141 inside of which the shaft 15 is arranged. In other words, the vibration motor 1 includes the single coil 141 attached onto the circuit board 13. In the coil 141, each of the two long side portions 145 is the torque generating portion which causes the torque to rotate the rotating portion to be generated between the magnet portion 17 and the coil 141. Thus, the coil portion 14 provides a greater length of the torque generating portion than in the case where a plurality of relatively small annular coils are arranged around the shaft 15. This contributes to reducing the size of the coil portion 14 while limiting a reduction in vibrations of the vibration motor 1. A reduction in the longitudinal dimension of the coil portion 14 leads to a reduction in the radial dimension of the vibration motor 1.

Each radially outer end portion of the coil 141 is arranged radially outward of the outer circumferential edge of the magnet portion 17. This contributes to increasing the length of each aforementioned torque generating portion of the coil 141. This in turn contributes to increasing the torque to rotate the rotating portion of the vibration motor 1.

In addition, because the number of coils 141 included in the coil portion 14 is one, the number of points of connection between the coil(s) 141 and the circuit board 13 is minimized. This results in a reduced number of processes required to manufacture the vibration motor 1. Moreover, because only one coil 141 needs to be positioned when the coil portion 14 is attached onto the circuit board 13, the manufacture of the vibration motor 1 is simplified when compared to the case where a plurality of coils need to be positioned.

As described above, the coil 141 includes the two long side portions 145 which extend in the longitudinal direction of the coil 141 and which have the shaft 15 arranged therebetween. That is, the torque generating portions of the coil 141 are arranged at two positions away from each other in the circumferential direction by about 180 degrees. At the two positions, the two long side portions 145 of the coil 141 are arranged in proximity to each other. The number of magnetic poles 171 of the magnet portion 17 is a multiple of two, and this contributes to easily preventing the circumferential middle of each of the magnetic poles 171 from coinciding with any of the aforementioned two positions when viewed in the vertical direction. In other words, each magnetic pole 171 of the magnet portion 17 can be easily prevented from being positioned at any dead point when the rotating portion is in the stopped state. Further, arranging the number of magnetic poles 171 to be a multiple of four contributes to more easily preventing each magnetic pole 171 of the magnet portion 17 from being positioned at any dead point when the rotating portion is in the stopped state.

In addition, in the magnet portion 17, the magnetic poles 171 are arranged at equal angular intervals in the circumferential direction. This also contributes to easily preventing the circumferential middle of each of the magnetic poles 171 from coinciding with any of the aforementioned two positions when viewed in the vertical direction. In other words, each magnetic pole 171 of the magnet portion 17 can be easily prevented from being positioned at any dead point when the rotating portion is in the stopped state.

As described above, the number of magnetic element portions 125 is equal to or smaller than the number of magnetic poles 171. This contributes to increasing the probability that the circumferential middle of any magnetic pole 171 will be positioned over the circumferential middle of each magnetic element portion 125 when the rotating portion stops. This makes it easier to prevent each magnetic pole 171 of the magnet portion from being positioned at any dead point when the rotating portion is in the stopped state.

In the preferred embodiment illustrated in FIG. 8, the number of magnetic element portions 125 is equal to the number of magnetic poles 171. In addition, both the magnetic poles 171 and the magnetic element portions 125 are arranged at equal angular intervals in the circumferential direction. This contributes to further increasing the probability that the circumferential middle of any magnetic pole 171 will be positioned over the circumferential middle of each magnetic element portion 125 when the rotating portion stops. This makes it still easier to prevent each magnetic pole 171 of the magnet portion 17 from being positioned at any dead point when the rotating portion is in the stopped state.

In order to easily prevent each magnetic pole 171 from being positioned at any dead point when the rotating portion is in the stopped state, it is preferable that the number of coils 141 be one, the number of magnetic poles 171 of the magnet portion 17 be four, and the number of magnetic element portions 125 be four, as described above.

As described above, the coil 141 includes the two long side portions 145 which extend in the longitudinal direction of the coil 141 and which have the shaft 15 arranged therebetween. The width of the interspace between the two long side portions 145 is smaller on one side of the longitudinal middle of the coil 141 than on the other side of the longitudinal middle. In addition, on the above one side of the longitudinal middle of the coil 141, the electronic component 24 is attached onto the circuit board 13 at a position close to one of the long side portions 145 of the coil 141, that is, near the one of the long side portions 145. This allows the electronic component 24 to be arranged at a position away from an outer edge of the base portion 12. This makes it easy to arrange the electronic component 24 while limiting an increase in the size of the vibration motor 1.

The angle A1 defined between the coil middle plane S5 and the component middle plane S6 is 45 degrees. This makes it easy to arrange the electronic component 24. In addition, the lead wires 147 extending from the coil 141 are connected to the circuit board 13 on the opposite side of the coil 141 with respect to the electronic component 24. This prevents the lead wires 147 extending from the coil 141 from limiting the arrangement of the electronic component 24. This makes it still easier to arrange the electronic component 24.

Figure 11:
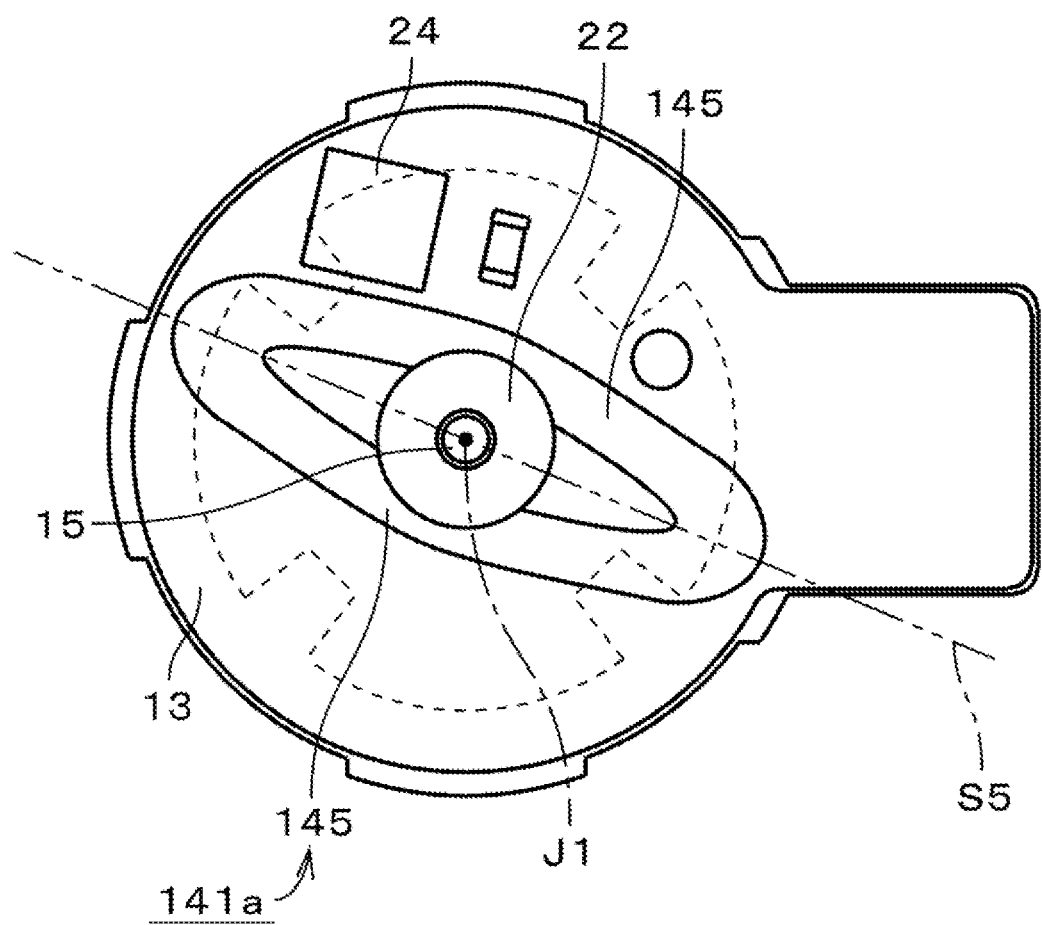
FIG. 11 is a plan view of a stationary portion according to a modification of the first preferred embodiment of the present invention.
Figure 12:
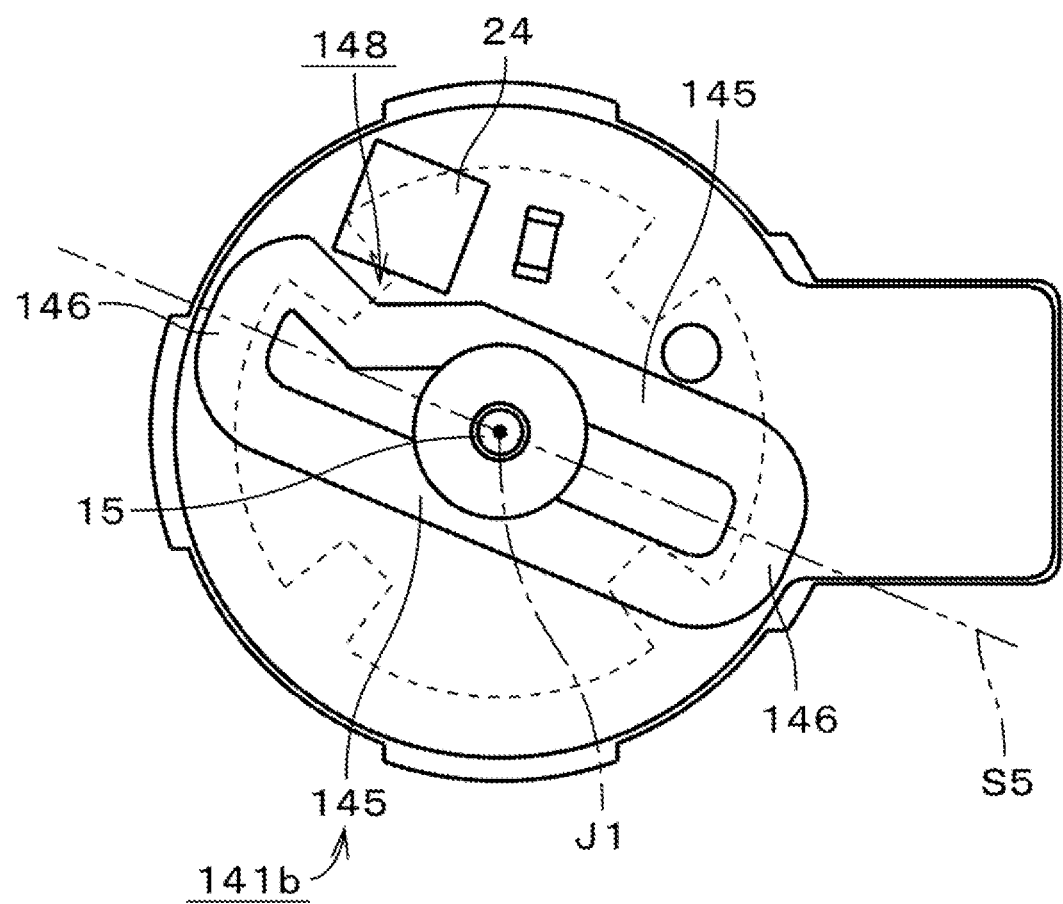
FIG. 12 is a plan view of a stationary portion according to a modification of the first preferred embodiment of the present invention.

Note that the shape of the coil 141 does not need to be limited to the above-described example, but may be modified in various manners. Each of FIGS. 11 and 12 is a plan view of a stationary portion according to a modification of the above-described preferred embodiment, in which the coil has a different shape. In the modification illustrated in FIG. 11, a coil 141a includes two long side portions 145 arranged to extend in the longitudinal direction of the coil 141a and to have a shaft 15 arranged therebetween. In more detail, each of the two long side portions 145 is arranged to extend along a coil middle plane S5 but not in parallel with the coil middle plane S5. The width of an interspace between the two long side portions 145 is arranged to gradually decrease with increasing distance from a longitudinal middle of the coil 141a. In other words, in a plan view, the coil 141a is substantially in the shape of a rhombus, and is elongated in the longitudinal direction. An electronic component 24 is attached onto a circuit board 13 at a position close to and outside of one of the long side portions 145 of the coil 141a and away from the longitudinal middle of the coil 141a in the longitudinal direction. This makes it easy to arrange the electronic component 24 while limiting an increase in the size of a vibration motor 1, as is similarly the case with the preferred embodiment illustrated in FIG. 5. When the coil 141a is provided, a spacer 22 may include, for example, an annular portion arranged opposite to an upper surface of the coil 141a in the vertical direction, and a cylindrical portion arranged to extend downward from an inner circumferential edge of the annular portion.

In the modification illustrated in FIG. 12, a coil 141b includes two long side portions 145 and two short side portions 146. Each of the two long side portions 145 is arranged to extend in a longitudinal direction of the coil 141b and to have a shaft 15 arranged therebetween. One of the two long side portions 145 includes a recessed portion 148 arranged to be recessed toward the other long side portion 145 at one position along the longitudinal direction. In the modification illustrated in FIG. 12, the recessed portion 148 is defined in the one of the long side portions 145 at a position away from a longitudinal middle thereof. In addition, an outer edge of the recessed portion 148 is defined by two straight lines. Except at the recessed portion 148, each of the two long side portions 145 is substantially parallel to a coil middle plane S5. An electronic component 24 is attached onto a circuit board 13 at a position close to the aforementioned one position in the aforementioned one of the long side portions 145. The electronic component 24 is arranged adjacent to the recessed portion 148 of the one of the long side portions 145 and outside of the coil 141b. This makes it easy to arrange the electronic component 24 while limiting an increase in the size of a vibration motor 1, as is similarly the case with the preferred embodiment illustrated in FIG. 5.

Figure 13:
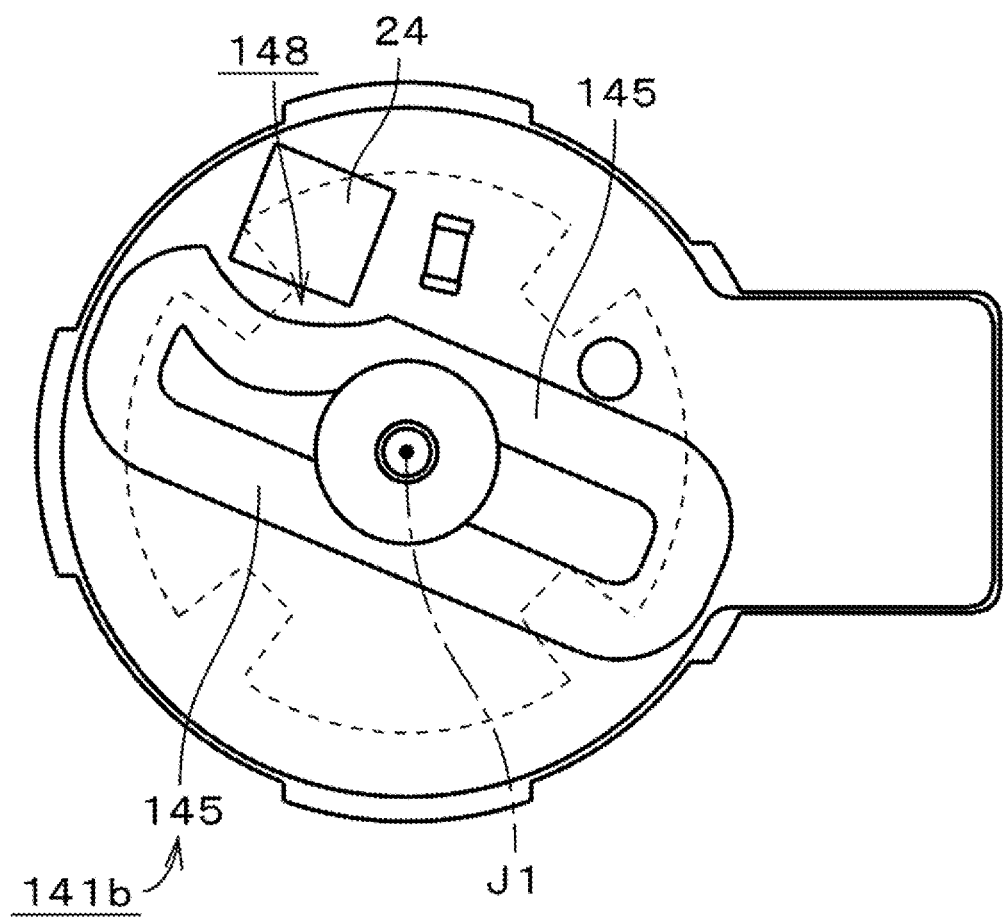
FIG. 13 is a plan view of a stationary portion according to a modification of the first preferred embodiment of the present invention.
Figure 14:
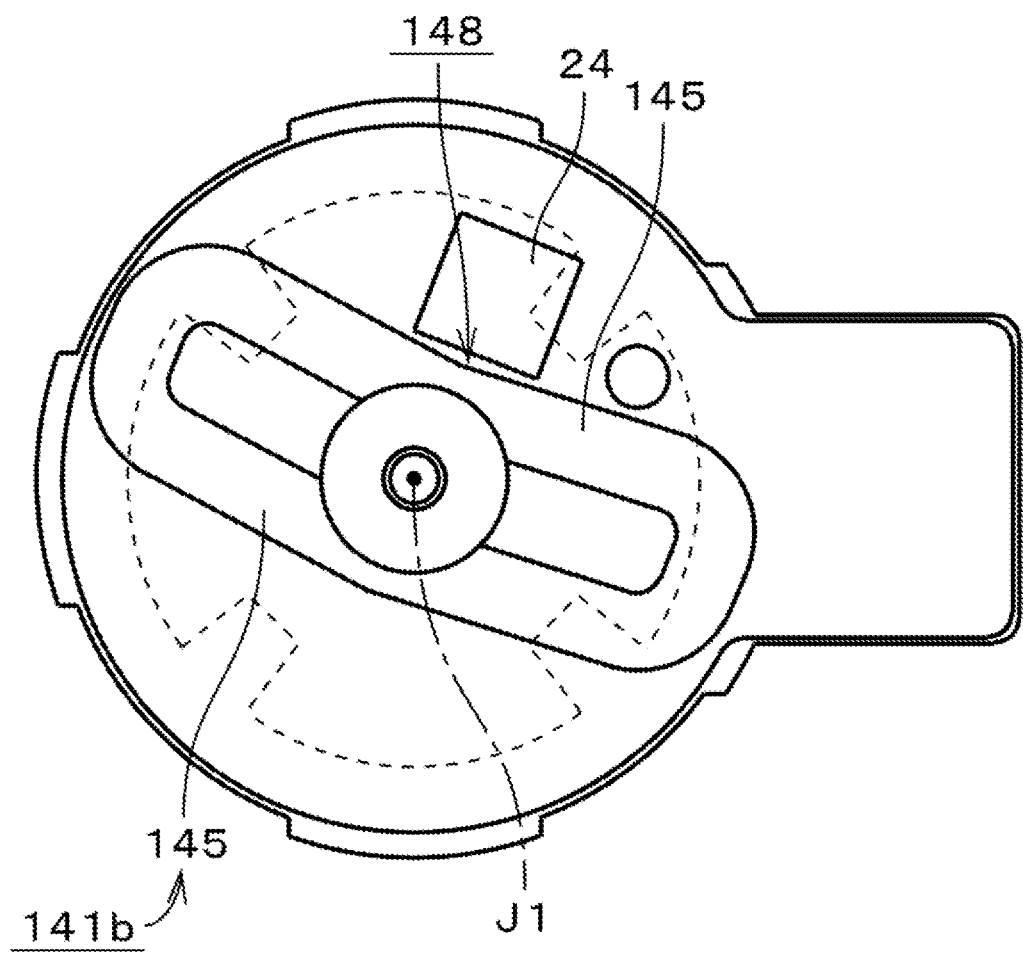
FIG. 14 is a plan view of a stationary portion according to a modification of the first preferred embodiment of the present invention.
Figure 15:
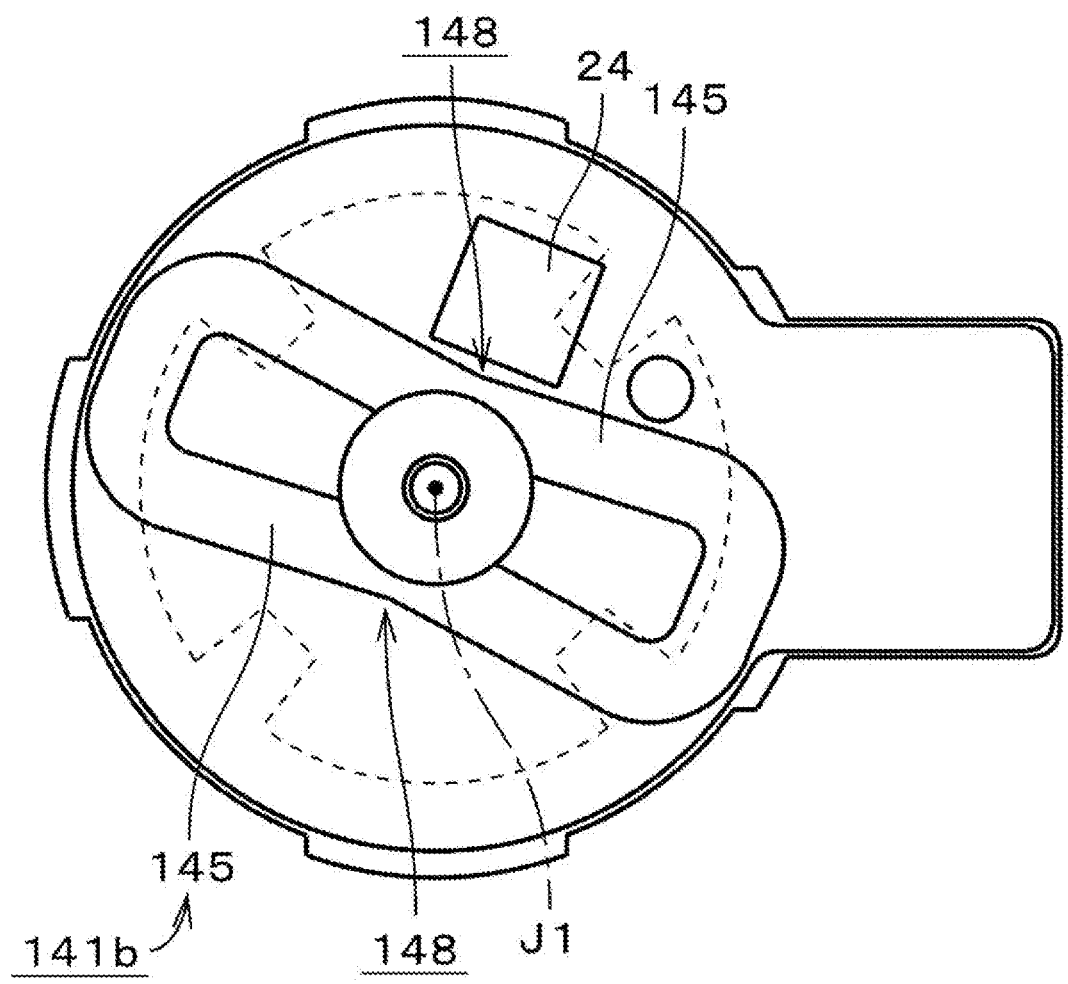
FIG. 15 is a plan view of a stationary portion according to a modification of the first preferred embodiment of the present invention.

Note that the outer edge of the recessed portion 148 of the coil 141b may alternatively be defined by a curve as illustrated in FIG. 13. Also note that the recessed portion 148 may alternatively be defined in the longitudinal middle of the long side portion 145 as illustrated in each of FIGS. 14 and 15. In a modification of the above-described preferred embodiment illustrated in FIG. 14, a recessed portion 148 is defined in the longitudinal middle of one of long side portions 145, and the other long side portion 145 is arranged to be substantially parallel to the one of the long side portions 145. In the modification illustrated in FIG. 14, an entire outer edge of the one of the long side portions 145 defines the recessed portion 148. In a modification of the above-described preferred embodiment illustrated in FIG. 15, a recessed portion 148 is defined in the middle of each of two long side portions 145. In the modification illustrated in FIG. 15, an entire outer edge of each long side portion 145 defines the recessed portion 148.

As illustrated in FIG. 2, the vibration motor 1 includes the spacer 22. The spacer 22 is attached to the shaft 15 between the bearing portion 21 and the coil portion 14. The upper surface 223 of the spacer 22 is arranged to be in contact with the lower surface 211 of the bearing portion 21. The lower surface 221 of the spacer 22 is arranged opposite to the upper surface 142 of the coil portion 14 in the vertical direction. Thus, in the vibration motor 1, the coil 141 of the coil portion 14 can be arranged radially closer to the shaft 15 than in a vibration motor in which a shaft and a spacer are arranged inside of a single coil, and than in a vibration motor in which a spacer is arranged radially inside of a plurality of coils arranged around a shaft. This contributes to reducing the radial dimension of the vibration motor 1 while limiting a reduction in the vibrations of the vibration motor 1.

As described above, the lower surface 221 of the spacer 22 is arranged to be in contact with the upper surface 142 of the coil 141 of the coil portion 14. This contributes to reducing the vertical dimension of the vibration motor 1. In addition, if the vibration motor 1 falls, for example, vertical movement of the coil 141 is limited, and this contributes to preventing the coil 141 from being detached from the circuit board 13. Further, the vertical position of the upper surface 142 of the coil 141 can be fixed, and this makes it easy to secure a vertical distance between the coil portion 14 and the magnet portion 17, that is, a gap between the coil portion 14 and the magnet portion 17.

As described above, the spacer 22 is attached to the shaft 15 through press fitting. This allows the spacer 22 to be securely fixed to the shaft 15. This in turn contributes to more effectively preventing the coil 141 of the coil portion 14 from being detached from the circuit board 13 if the vibration motor 1 falls, for example. In addition, this makes it easier to secure the vertical distance between the coil portion 14 and the magnet portion 17.

In the vibration motor 1, the spacer 22 is in the shape of a circular ring or in the shape of the letter "C", and is made of the resin. This allows the spacer 22 to have a simple shape. This in turn allows the spacer 22 to be easily manufactured.

As described above, the lower end of the shaft 15 is fixed in the base central through hole 128, which passes through the base portion 12 in the vertical direction. This contributes to reducing the thickness of the base portion 12, and reducing the thickness of the vibration motor 1. In addition, this makes it possible to securely fix the shaft 15 to the base portion 12.

In the vibration motor 1, the upper surface of the entire portion of the base portion 12 which lies between the shaft 15 and the inner circumferential edge of the coil 141 in the plan view is arranged at the same vertical level. This contributes to further reducing the thickness of the base portion 12. In addition, this contributes to simplifying the formation of the base portion 12. Further, absence of a protrusion around the shaft 15 in the base portion 12 allows the coil portion 14 to be arranged closer to the shaft 15. This contributes to reducing the radial dimension of the vibration motor 1. In addition, the length of each torque generating portion of the coil 141 can thus be increased, and this contributes to increasing the vibrations of the vibration motor 1.

Moreover, the upper surface of the entire portion of the base portion 12 which lies between the shaft 15 and the magnetic element portions 125 and the nonmagnetic element portions 127 is arranged at the same vertical level. This contributes to further reducing the thickness of the base portion 12, as in the case where the upper surface of the entire portion of the base portion 12 which lies between the shaft 15 and the inner circumferential edge of the coil 141 in the plan view is arranged at the same vertical level. In addition, this contributes to simplifying the formation of the base portion 12. Further, absence of a protrusion around the shaft 15 in the base portion 12 allows the coil portion 14 to be arranged closer to the shaft 15. This contributes to reducing the radial dimension of the vibration motor 1. In addition, the length of each torque generating portion of the coil 141 can thus be increased, and this contributes to increasing the vibrations of the vibration motor 1.

Figure 16:
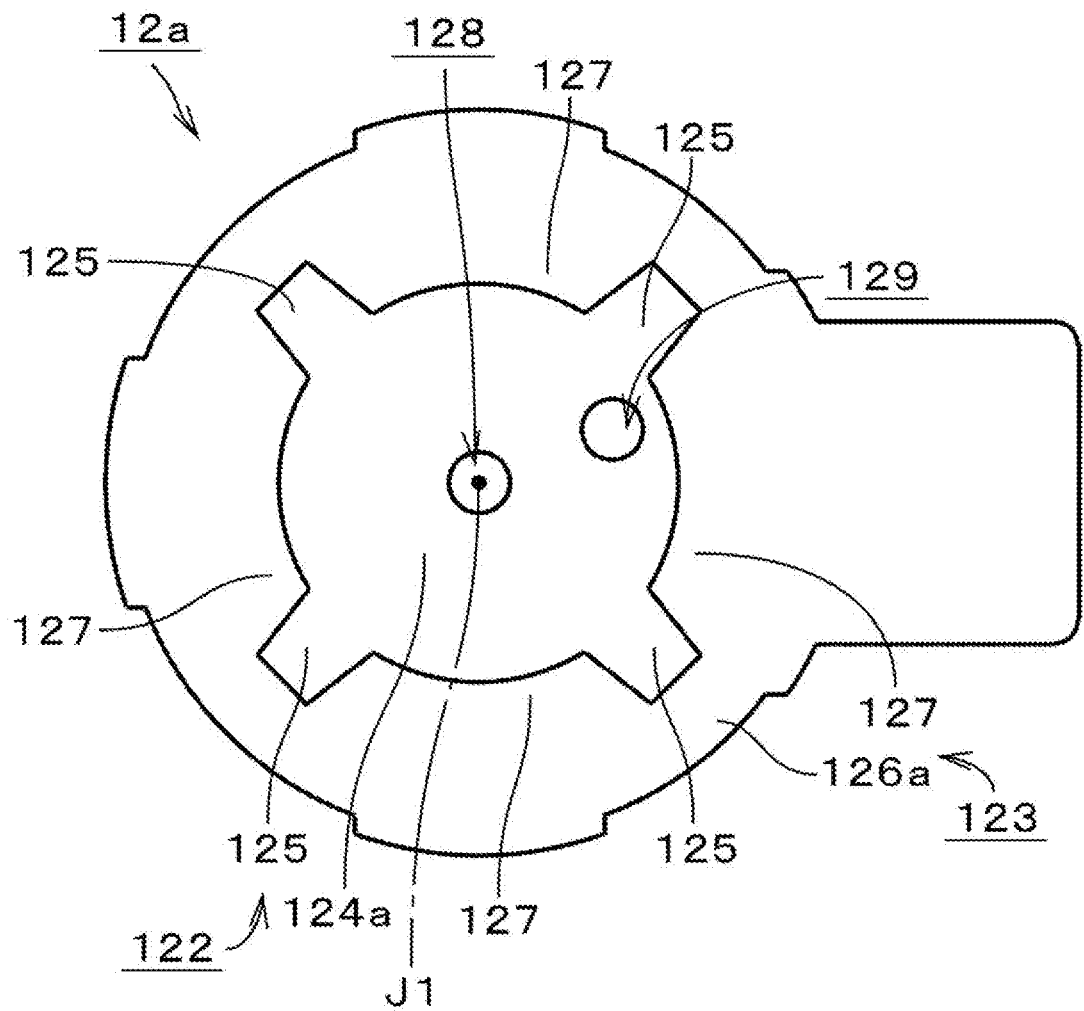
FIG. 16 is a plan view of a base portion according to a modification of the first preferred embodiment of the present invention.

FIG. 16 is a plan view illustrating a base portion 12a according to a modification of the above-described preferred embodiment. The base portion 12a illustrated in FIG. 16 includes a base magnetic portion 122 and a base nonmagnetic portion 123. The base portion 12a is different from the base portion 12 illustrated in FIG. 6 in the shape of the base magnetic portion 122 and the shape of the base nonmagnetic portion 123. As illustrated in FIG. 16, the base nonmagnetic portion 123 of the base portion 12a includes a nonmagnetic outer circumferential portion 126a and a plurality of nonmagnetic element portions 127. In the modification illustrated in FIG. 16, the base nonmagnetic portion 123 includes four nonmagnetic element portions 127. The nonmagnetic outer circumferential portion 126a is substantially annular. In more detail, the nonmagnetic outer circumferential portion 126a is substantially in the shape of a circular ring, and is centered on a central axis J1. The nonmagnetic outer circumferential portion 126a is arranged to surround an outer periphery of the base magnetic portion 122.

Each of the nonmagnetic element portions 127 is defined integrally with the nonmagnetic outer circumferential portion 126a. Each of the nonmagnetic element portions 127 is arranged to project radially inward from the nonmagnetic outer circumferential portion 126a. Each nonmagnetic element portion 127 is a nonmagnetic projecting portion arranged to project from an inner circumferential edge of the nonmagnetic outer circumferential portion 126a substantially perpendicularly to the vertical direction toward the central axis J1. Each of the nonmagnetic element portions 127 is arranged to have the same shape. The circumferential width of each of the nonmagnetic element portions 127 is arranged to decrease in the radially inward direction.

The base magnetic portion 122 of the base portion 12a includes a magnetic central portion 124a and a plurality of magnetic element portions 125. In the modification illustrated in FIG. 16, the base magnetic portion 122 includes four magnetic element portions 125. The magnetic central portion 124a is substantially in the shape of a disk, and is centered on the central axis J1. A base central through hole 128, which passes through the base portion 12a in the vertical direction, is defined in a central portion of the magnetic central portion 124a.

Each of the magnetic element portions 125 is defined integrally with the magnetic central portion 124a. Each of the magnetic element portions 125 is arranged to project radially outward from the magnetic central portion 124a. Each magnetic element portion 125 is a magnetic projecting portion arranged to project from an outer circumferential edge of the magnetic central portion 124a substantially perpendicularly to the vertical direction. Each of the magnetic element portions 125 is arranged to have the same shape. The magnetic element portions 125 are arranged to extend from the magnetic central portion 124a in a radial manner with the central axis J1 as a center. The circumferential width of each of the magnetic element portions 125 is arranged to decrease in the radially outward direction.

The nonmagnetic element portions 127 are arranged to alternate with the magnetic element portions 125 in the circumferential direction. The circumferential width of each magnetic element portion 125 is smaller than the circumferential width of each nonmagnetic element portion 127 at any radial position. The magnetic element portions 125 and the nonmagnetic element portions 127 are arranged in the circumferential direction, and are arranged at positions opposed to a magnet portion 17 in the vertical direction. The magnetic element portions 125 are arranged at equal angular intervals in the circumferential direction. The nonmagnetic element portions 127 are also arranged at equal angular intervals in the circumferential direction.

Similarly to the base portion 12, the base portion 12a is made of a metal. This contributes to reducing the thickness of the base portion 12a while limiting a reduction in strength of the base portion 12a.

In the base portion 12a, as in the base portion 12, the base nonmagnetic portion 123 is fixed to an edge portion of the base magnetic portion 122, and is arranged to extend from the edge portion of the base magnetic portion 122 perpendicularly to the vertical direction. The base magnetic portion 122 includes the magnetic element portions 125 as described above. The magnetic element portions 125 are arranged in the circumferential direction, and are arranged at the positions opposed to the magnet portion 17 in the vertical direction. The base nonmagnetic portion 123 includes the nonmagnetic element portions 127. The nonmagnetic element portions 127 are arranged to alternate with the magnetic element portions 125 in the circumferential direction, and are arranged at the positions opposed to the magnet portion 17 in the vertical direction. In a vibration motor 1 including the base portion 12a, as in the vibration motor 1 including the base portion 12, each of magnetic poles 171 of the magnet portion 17 can be prevented from being positioned at any dead point when a rotating portion is in the stopped state.

In the base portion 12a, as in the base portion 12, the base magnetic portion 122 and the base nonmagnetic portion 123 do not overlap with each other at any position outside of a boundary portion between the base magnetic portion 122 and the base nonmagnetic portion 123 when viewed in the vertical direction. This contributes to reducing the thickness of the base portion 12a. This in turn leads to a reduced thickness of the vibration motor 1.

In addition, in the base portion 12a, the base magnetic portion 122 and the base nonmagnetic portion 123 do not overlap with each other even at the boundary portion 120 when viewed in the vertical direction. This contributes to a further reduction in the thickness of the base portion 12a. This in turn leads to a further reduction in the thickness of the vibration motor 1. Moreover, the edge portion of the base magnetic portion 122 and an edge portion of the base nonmagnetic portion 123 can be easily defined. This makes it easy to manufacture the base portion 12a.

As described above, the base nonmagnetic portion 123 further includes the nonmagnetic outer circumferential portion 126a surrounding the outer periphery of the base magnetic portion 122. Each of the nonmagnetic element portions 127 is arranged to project radially inward from the nonmagnetic outer circumferential portion 126a. The base magnetic portion 122 further includes the magnetic central portion 124a, to which a lower end of a shaft 15 is fixed. Each of the magnetic element portions 125 is arranged to project radially outward from the magnetic central portion 124a. This structure of the base portion 12a allows the magnetic element portions 125 and the nonmagnetic element portions 127 to be easily defined. This makes it easy to manufacture the base portion 12a.

In the base magnetic portion 122, a radially outer end portion of each of the magnetic element portions 125 is arranged opposite to the magnet portion 17 in the vertical direction. This contributes to increasing cogging torque generated between the magnetic element portion 125 and the magnet portion 17. This makes it easier to prevent each magnetic pole 171 of the magnet portion from being positioned at any dead point when the rotating portion is in the stopped state.

In addition, the circumferential width of a portion of each magnetic element portion 125 which is opposed to the magnet portion 17 in the vertical direction is equal to or smaller than the circumferential width of each magnetic pole 171 of the magnet portion 17 at any radial position. This contributes to preventing a magnetic force from acting between each magnetic element portion 125 and any magnetic pole 171 adjacent to the magnetic pole 171 positioned over the magnetic element portion 125. This makes it easier to prevent each magnetic pole 171 of the magnet portion 17 from being positioned at any dead point when the rotating portion is in the stopped state.

Further, the circumferential width of each of the magnetic element portions 125 is arranged to decrease in the radially outward direction. This makes it easy to define the magnetic element portions 125 when the base magnetic portion 122 is manufactured. This in turn makes it easy to manufacture the base portion 12a.

The base portion 12a includes a base peripheral through hole 129, which passes through the base portion 12a in the vertical direction, at a position away from the shaft 15. In the modification illustrated in FIG. 16, the base peripheral through hole 129 is defined in the base magnetic portion 122, the outer periphery of which is surrounded by the base nonmagnetic portion 123. The base peripheral through hole 129 is thus defined at a position away from an outer edge portion of the base portion 12a, and this contributes to limiting a reduction in the strength of the base portion 12a caused by the base peripheral through hole 129.

As described above, in each of the base portions 12 and 12a, one of the base nonmagnetic portion 123 and the base magnetic portion 122 is arranged to surround the outer periphery of the other one of the base nonmagnetic portion 123 and the base magnetic portion 122. Then, the base peripheral through hole 129 is defined in the other one of the base nonmagnetic portion 123 and the base magnetic portion 122. The base peripheral through hole 129 is thus defined at a position away from the outer edge portion of the base portion 12 or 12a, and this contributes to limiting a reduction in the strength of the base portion 12 or 12a caused by the base peripheral through hole 129.

Figure 17:
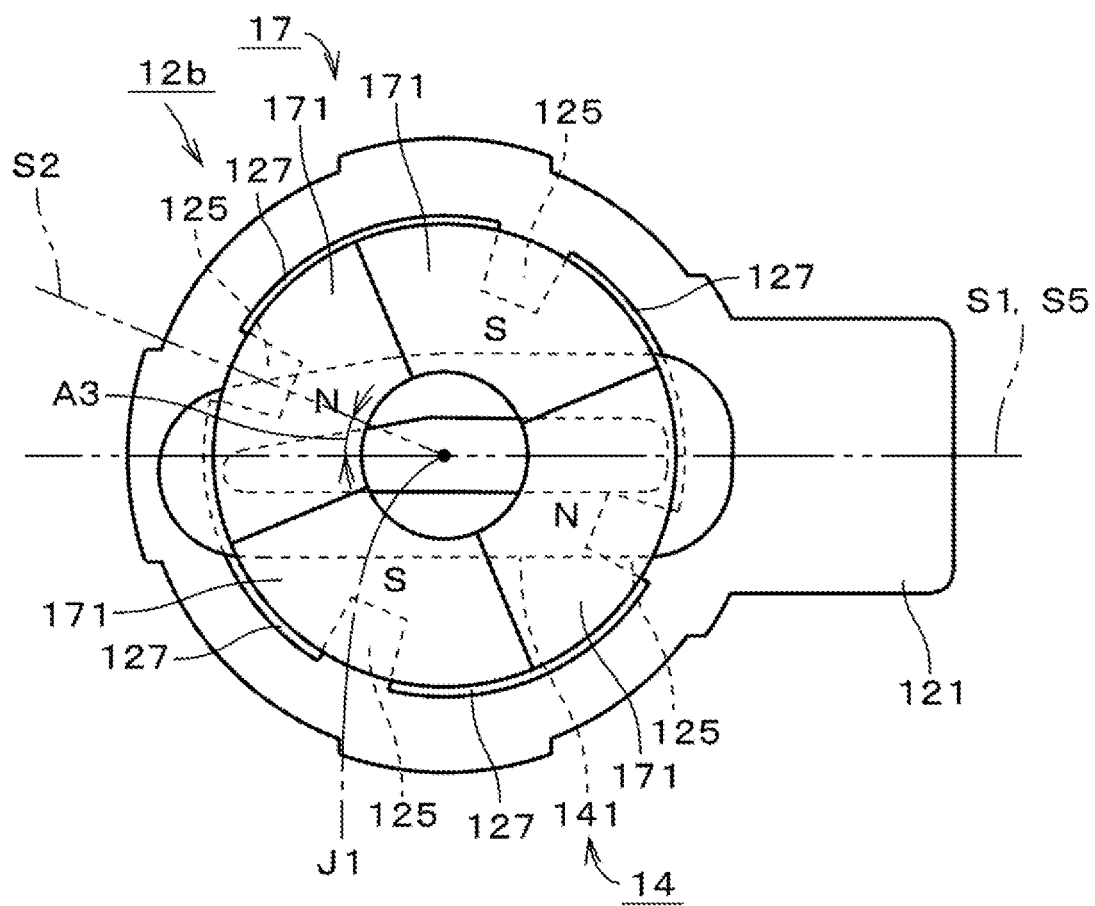
FIG. 17 is a plan view of a magnet portion, a coil portion, and a base portion according to a modification of the first preferred embodiment of the present invention.

FIG. 17 is a plan view illustrating a base portion 12b according to another modification of the above-described preferred embodiment. In FIG. 17, as in FIG. 8, a magnet portion 17, a coil portion 14, and the base portion 12b are shown. The base portion 12b illustrated in FIG. 17 is different from the base portion 12 illustrated in FIG. 6 in circumferential positions of a plurality of magnetic element portions 125 and a plurality of nonmagnetic element portions 127. In addition, in FIG. 17, the orientation of the coil portion 14 is different from that in FIG. 8.

In FIG. 17, as in FIG. 6, a first plane S1, which includes a central axis J1 and a circumferential middle of a base projecting portion 121, is represented by a chain double-dashed line. A coil middle plane S5, which is parallel to a longitudinal direction of a coil 141 and which includes the central axis J1, coincides with the first plane S1. In addition, a second plane S2, which includes the central axis J1 and a circumferential middle of one of the magnetic element portions 125 that is closest to the first plane S1 in the circumferential direction of all the magnetic element portions 125, is also represented by a chain double-dashed line. In FIG. 17, the magnetic element portion 125 in the upper left of the figure is regarded as this one of the magnetic element portions 125. An angle A3 defined between the first plane S1 and the second plane S2 is, for example, 22.5 degrees. The angle A3 is equal to 90 degrees divided by the number of magnetic poles 171. This contributes to more easily preventing each magnetic pole 171 of the magnet portion 17 from being positioned at any dead point when a rotating portion is in the stopped state.

Figure 18:
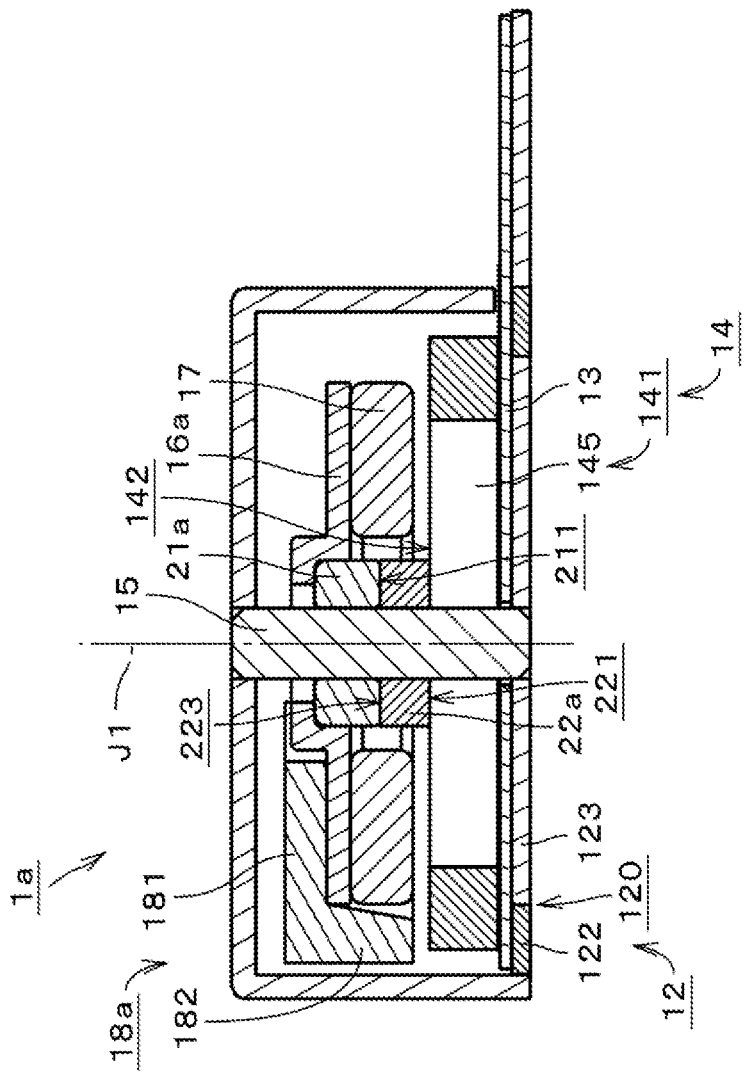
FIG. 18 is a vertical sectional view of a vibration motor according to a second preferred embodiment of the present invention.
Figure 19:
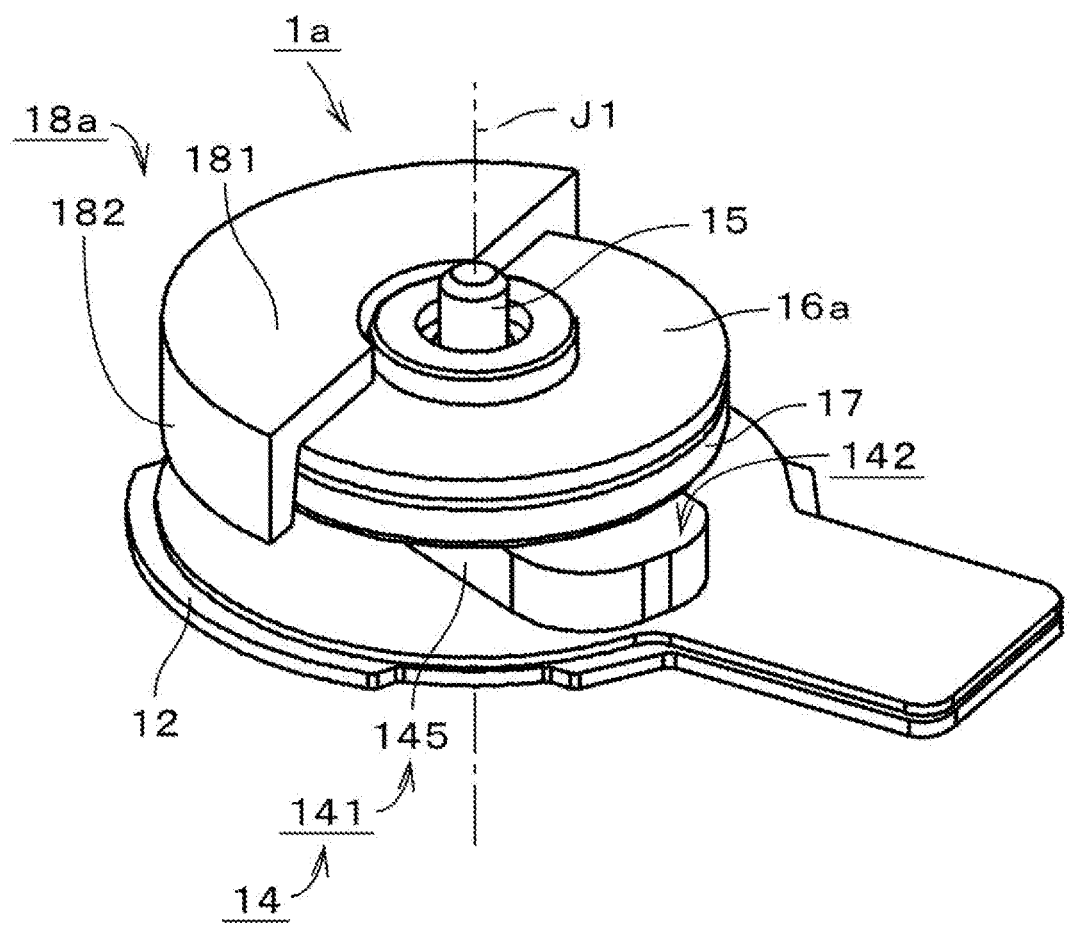
FIG. 19 is a perspective view of a rotating portion and a stationary portion of the vibration motor according to the second preferred embodiment of the present invention.

FIG. 18 is a vertical sectional view of a vibration motor 1a according to a second preferred embodiment of the present invention. FIG. 19 is a perspective view illustrating a rotating portion and a stationary portion of the vibration motor 1a. The vibration motor 1a includes the rotating portion and a spacer 22a, which are different in shape from the rotating portion and the spacer 22, respectively, of the vibration motor 1 illustrated in FIG. 2. The rotating portion of the vibration motor 1a includes a bearing portion 21a, a rotor holder 16a, a magnet portion 17, and an eccentric weight 18a. The vibration motor 1a is otherwise similar in structure to the vibration motor 1 illustrated in FIGS. 1 to 6, and accordingly, like members or portions are designated by like reference numerals.

The spacer 22a is a substantially annular, tubular member including a through hole defined in a center thereof. In the preferred embodiment illustrated in FIG. 18, the spacer 22a is in the shape of a circular ring, and is centered on a central axis J1. Note that the spacer 22a may alternatively be, for example, in the shape of the letter "C", that is, a circular ring with one circumferential portion omitted. A shaft 15 is inserted through the through hole of the spacer 22a. The spacer 22a is attached to the shaft 15 through, for example, press fitting. The spacer 22a is arranged above a coil portion 14, and is fixed to the shaft 15. The spacer 22a is made of, for example, a resin. Note that the spacer 22a may alternatively be made of another material. Also note that the spacer 22a may alternatively be attached to the shaft 15 by a method other than press fitting.

A lower surface 221 of the spacer 22a is arranged opposite to an upper surface 142 of a coil 141 of the coil portion in the vertical direction. In the preferred embodiment illustrated in FIG. 18, the lower surface 221 of the spacer 22a is arranged to be in contact with the upper surface 142 of the coil 141 of the coil portion 14. The spacer 22a is arranged radially inside of the magnet portion 17. In other words, an upper surface 223 of the spacer 22a is arranged at a level higher than that of a lower surface of the magnet portion 17. This contributes to reducing the vertical dimension of the vibration motor 1a when compared to a vibration motor in which a magnet portion is arranged above an upper surface of a spacer. The spacer 22a is arranged radially opposite to the magnet portion 17 with a gap therebetween.

The bearing portion 21a is an annular member including a through hole defined in a center thereof. In the preferred embodiment illustrated in FIG. 18, the bearing portion 21a is substantially cylindrical, and is centered on the central axis J1. The shaft 15 is inserted through the through hole of the bearing portion 21a. The bearing portion 21a is attached to the shaft 15 to be rotatable with respect to the shaft 15 above the coil 141 of the coil portion 14. In addition, the bearing portion 21a is arranged above the spacer 22a. In other words, the spacer 22a is attached to the shaft 15 between the bearing portion 21a and the coil 141 of the coil portion 14. The upper surface 223 of the spacer 22a is arranged to be in contact with a lower surface 211 of the bearing portion 21a.

The rotor holder 16a is a member substantially in the shape of a circular ring. The rotor holder 16a is attached to the bearing portion 21a. In more detail, an inner circumferential portion of the rotor holder 16a, which is substantially in the shape of an annular plate, is fixed to an upper end surface and an upper portion of an outer circumferential surface of the bearing portion 21a. The rotor holder 16a is thus supported by the bearing portion 21a to be rotatable with respect to the shaft 15. The rotor holder 16a is made of, for example, a metal.

The magnet portion 17 is a member substantially in the shape of a circular ring, and is centered on the central axis J1. The magnet portion 17 is attached to the rotor holder 16a. In more detail, an upper surface of the magnet portion 17, which is substantially cylindrical, is attached to a lower surface of the rotor holder 16a. The magnet portion 17 is arranged above the coil 141 of the coil portion 14, and is arranged opposite to the coil 141 in the vertical direction with a gap therebetween. The magnet portion 17 is arranged around the bearing portion 21a and the spacer 22a. The bearing portion 21a is arranged radially inside of the magnet portion 17, and is arranged radially opposite to the magnet portion 17 with a gap therebetween.

The eccentric weight 18a is arranged to have a shape corresponding to that of a left half of a member substantially in the shape of a covered cylinder. The eccentric weight 18a is substantially in the shape of a semicircle in a plan view. The eccentric weight 18a is attached to the rotor holder 16a. In more detail, a lower surface of a top cover portion 181 of the eccentric weight 18a is attached to an upper surface of the rotor holder 16a through, for example, an adhesive. A side wall portion 182 of the eccentric weight 18a is arranged to cover a portion of a lateral side of the rotor holder 16a and a portion of a lateral side of the magnet portion 17. A lower end of the side wall portion 182 of the eccentric weight 18a is arranged at substantially the same vertical level as that of a lower end of the magnet portion 17. The center of gravity of the eccentric weight 18a is radially away from the central axis J1.

The vibration motor 1a includes the base portion 12 illustrated in FIG. 6. As described above, the base portion 12 includes the base magnetic portion 122 and the base nonmagnetic portion 123. The base magnetic portion 122 and the base nonmagnetic portion 123 do not overlap with each other at any position outside of the boundary portion between the base magnetic portion 122 and the base nonmagnetic portion 123 when viewed in the vertical direction. This allows the base portion 12 to have a smaller thickness than in the case where the base magnetic portion 122 and the base nonmagnetic portion 123 overlap with each other at a position other than the boundary portion 120. This leads to a reduced thickness of the vibration motor 1a.

The vibration motor 1a includes the coil portion 14 illustrated in FIG. 5. As described above, the coil portion 14 is defined by the single annular coil 141 inside of which the shaft 15 is arranged. In the coil 141, each of the two long side portions 145 is the torque generating portion which causes a torque to rotate the rotating portion to be generated between the magnet portion 17 and the coil 141. This makes it possible to reduce the size of the coil portion 14 while limiting a reduction in vibrations of the vibration motor 1a. A reduction in the longitudinal dimension of the coil portion 14 leads to a reduction in the radial dimension of the vibration motor 1a.

Figure 20:
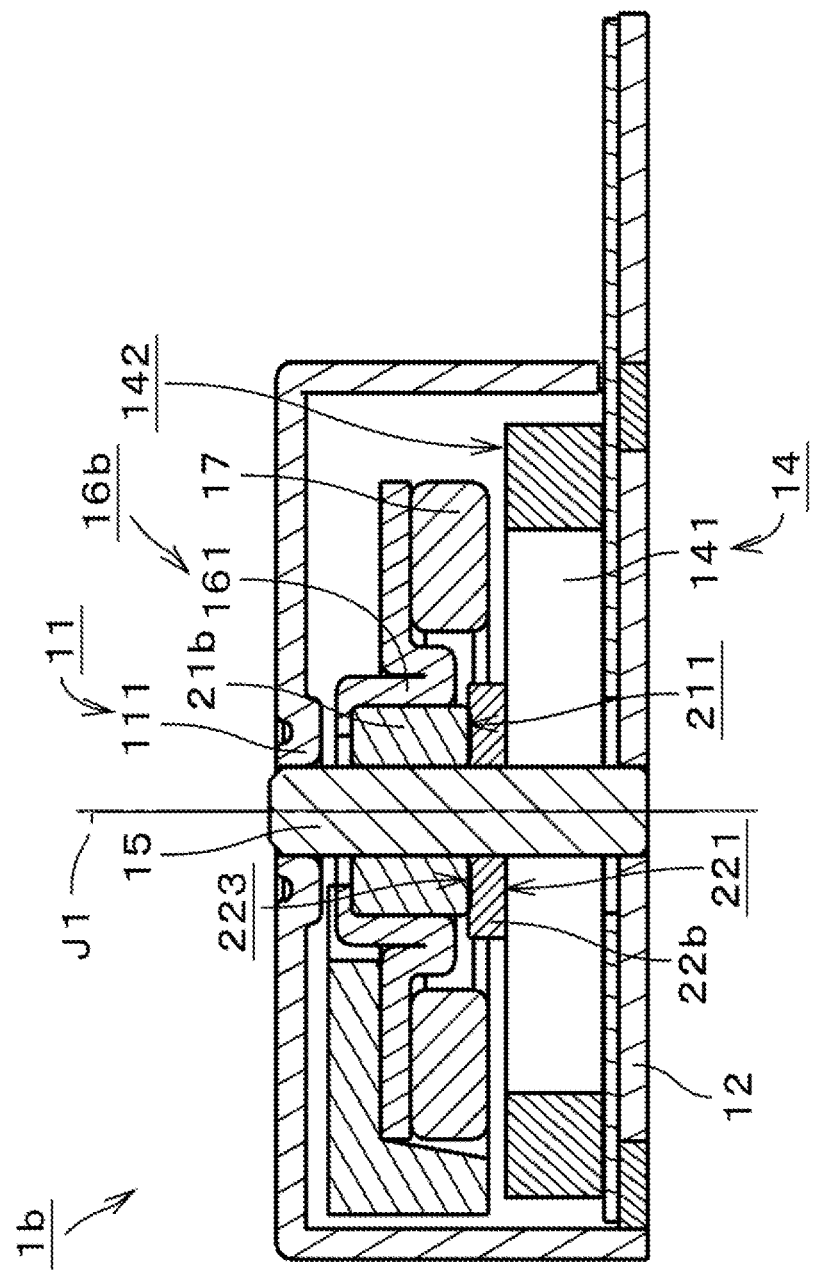
FIG. 20 is a vertical sectional view of a vibration motor according to a third preferred embodiment of the present invention.

FIG. 20 is a vertical sectional view of a vibration motor 1b according to a third preferred embodiment of the present invention. The vibration motor 1b includes a rotor holder 16b and a spacer 22b, which are different in shape from the rotor holder 16a and the spacer 22a, respectively, of the vibration motor 1a illustrated in FIGS. 18 and 19. The vibration motor 1b is otherwise similar in structure to the vibration motor 1a illustrated in FIGS. 18 and 19, and accordingly, like members or portions are designated by like reference numerals.

The spacer 22b is a substantially annular, tubular member including a through hole defined in a center thereof. In the preferred embodiment illustrated in FIG. 20, the spacer 22b is in the shape of a circular ring, and is centered on a central axis J1. Note that the spacer 22b may alternatively be, for example, in the shape of the letter "C", that is, a circular ring with one circumferential portion omitted. A shaft 15 is inserted through the through hole of the spacer 22b. The spacer 22b is attached to the shaft 15 through, for example, press fitting. The spacer 22b is arranged above a coil portion 14, and is fixed to the shaft 15. The spacer 22b is made of, for example, a resin. Note that the spacer 22b may alternatively be made of another material. Also note that the spacer 22b may alternatively be attached to the shaft 15 by a method other than press fitting.

A lower surface 221 of the spacer 22b is arranged opposite to an upper surface 142 of a coil 141 of the coil portion 14 in the vertical direction. In the preferred embodiment illustrated in FIG. 20, the lower surface 221 of the spacer 22b is arranged to be in contact with the upper surface 142 of the coil 141 of the coil portion 14. The spacer 22b is arranged radially inside of a magnet portion 17. In other words, an upper surface 223 of the spacer 22b is arranged at a level higher than that of a lower surface of the magnet portion 17. This contributes to reducing the vertical dimension of the vibration motor 1b when compared to a vibration motor in which a magnet portion is arranged above an upper surface of a spacer. The spacer 22b is arranged radially opposite to the magnet portion 17 with a gap therebetween.

The rotor holder 16b is attached to a bearing portion 21b. In more detail, an inner circumferential portion 161 of the rotor holder 16b is attached to an upper end surface and an outer circumferential surface of the bearing portion 21b. The inner circumferential portion 161 of the rotor holder 16b is fixed to the substantially entire outer circumferential surface of the bearing portion 21b. This allows the rotor holder 16b to be securely attached to the bearing portion 21b. The rotor holder 16b is bent radially outward and upward at a lower end portion of the inner circumferential portion 161, and is then bent radially outward to extend radially outward.

In the vibration motor 1b, a top cover portion of a cover portion 11 includes a cover projecting portion 111 at a junction of the top cover portion with the shaft 15. The cover projecting portion 111 is arranged to project downward along the shaft 15. This increases the vertical dimension of an area over which the cover portion 11 and the shaft 15 are joined to each other. This allows the cover portion 11 to be more securely fixed to the shaft 15.

Similarly to the vibration motor 1a, the vibration motor 1b includes the base portion 12 illustrated in FIG. 6. This contributes to reducing the thickness of the base portion 12, and, in turn, contributes to reducing the thickness of the vibration motor 1b. In addition, similarly to the vibration motor 1a, the vibration motor 1b includes the coil portion 14 including the coil 141 illustrated in FIG. 5. This allows the longitudinal dimension of the coil portion 14 to be reduced to reduce the radial dimension of the vibration motor 1b, while limiting a reduction in vibrations of the vibration motor 1b.

Figure 21:
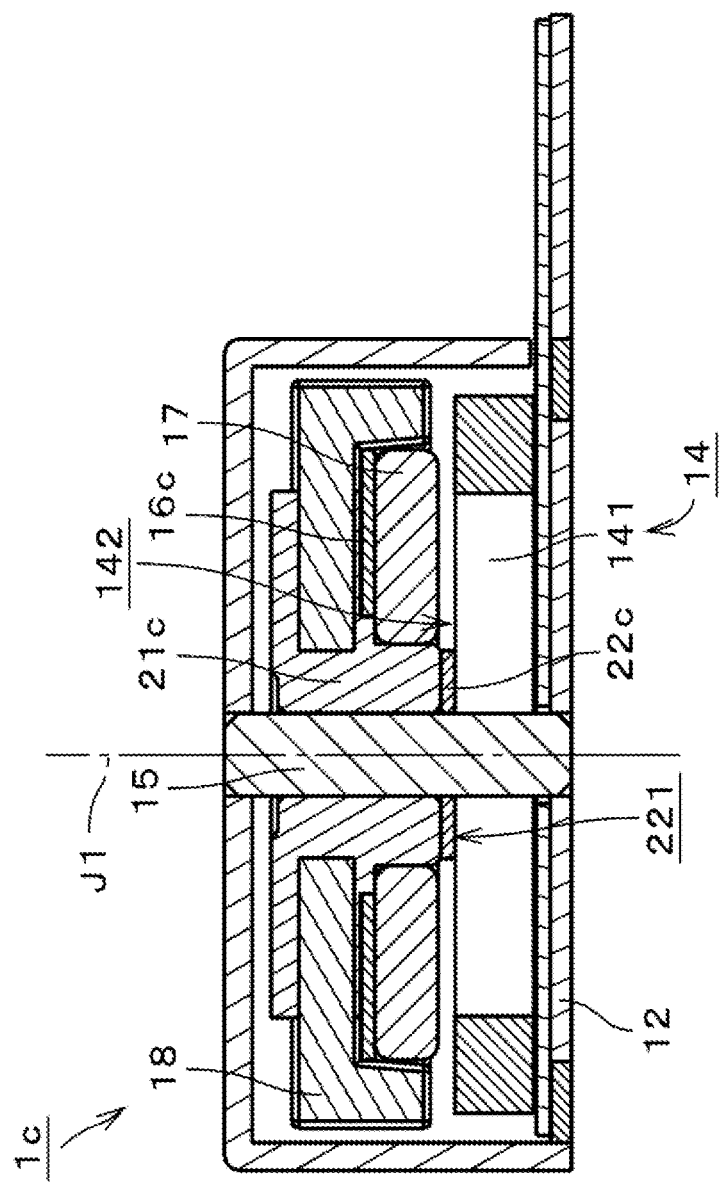
FIG. 21 is a vertical sectional view of a vibration motor according to a fourth preferred embodiment of the present invention.
Figure 22:
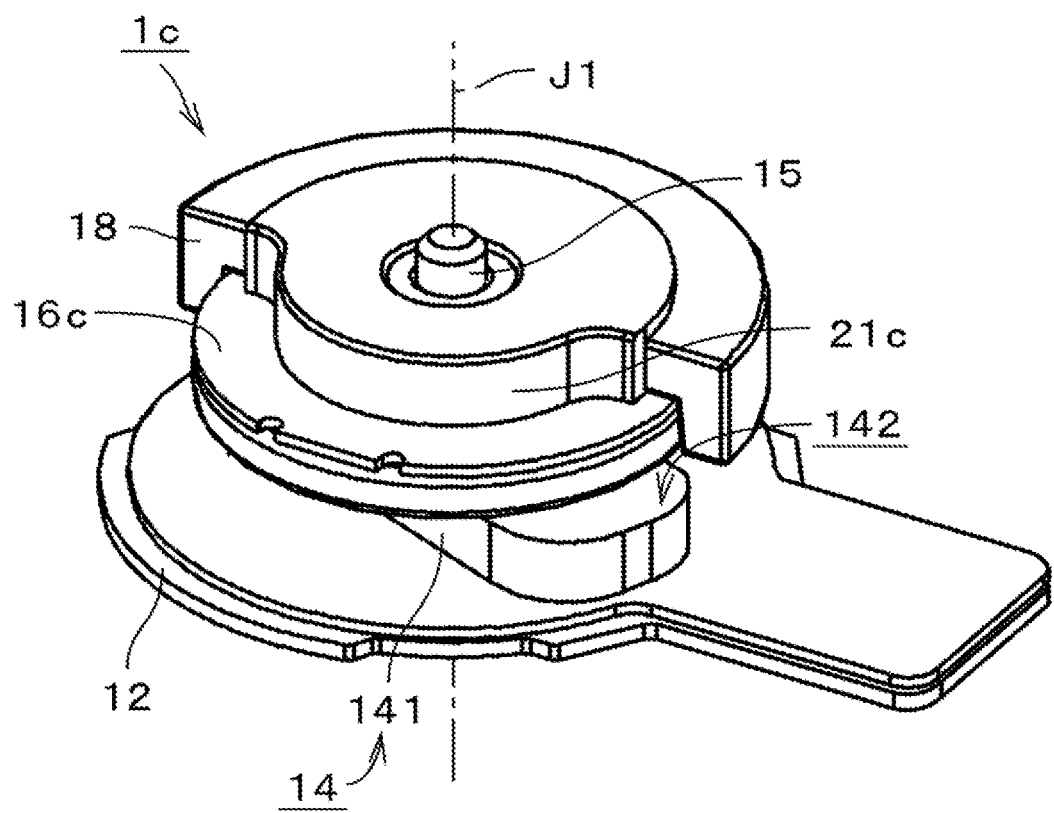
FIG. 22 is a perspective view of a rotating portion and a stationary portion of the vibration motor according to the fourth preferred embodiment of the present invention.

FIG. 21 is a vertical sectional view of a vibration motor 1c according to a fourth preferred embodiment of the present invention. FIG. 22 is a perspective view illustrating a rotating portion and a stationary portion of the vibration motor 1c. The orientation of an eccentric weight 18 in FIGS. 21 and 22 is different from the orientation of the eccentric weight 18a in FIGS. 18 and 19 by 90 degrees. The vibration motor 1c includes a rotor holder 16c, a bearing portion 21c, and a spacer 22c, which are different in shape from the rotor holder 16a, the bearing portion 21a, and the spacer 22a, respectively, of the vibration motor 1a illustrated in FIGS. 18 and 19. The vibration motor 1c is otherwise similar in structure to the vibration motor 1a illustrated in FIGS. 18 and 19, and accordingly, like members or portions are designated by like reference numerals.

The spacer 22c is arranged to have the same shape as that of the spacer 22 illustrated in FIG. 2, and is made of the same material as that of the spacer 22, for example. Similarly to the spacer 22, the spacer 22c is attached to the shaft 15, for example. A lower surface 221 of the spacer 22c is arranged opposite to an upper surface 142 of a coil 141 of a coil portion in the vertical direction. In the preferred embodiment illustrated in FIGS. 21 and 22, the lower surface 221 of the spacer 22c is arranged to be in contact with the upper surface 142 of the coil 141 of the coil portion 14.

The rotor holder 16c is substantially in the shape of an annular plate, and is centered on a central axis J1. The bearing portion 21c is, for example, made of a resin, and is defined integrally with the rotor holder 16c and the eccentric weight 18 by an insert molding process. A large part of the rotating portion is thus defined by the insert molding process, and this contributes to reducing the number of parts of the vibration motor 1c. This leads to simpler assemblage of the vibration motor 1c.

Similarly to the vibration motor 1a, the vibration motor 1c includes the base portion 12 illustrated in FIG. 6. This contributes to reducing the thickness of the base portion 12, and, in turn, contributes to reducing the thickness of the vibration motor 1c. In addition, similarly to the vibration motor 1a, the vibration motor 1c includes the coil portion 14 including the coil 141 illustrated in FIG. 5. This allows the longitudinal dimension of the coil portion 14 to be reduced to reduce the radial dimension of the vibration motor 1c, while limiting a reduction in vibrations of the vibration motor 1c.

In each of the vibration motors 1a, 1b, and 1c, the above-described base portion 12a or the above-described base portion 12b may be used in place of the base portion 12. Even in this case, each of the vibration motors 1a, 1b, and 1c is able to achieve a reduced thickness as described above. In each of the vibration motors 1a, 1b, and 1c, the coil 141a or the coil 141b may be used in place of the coil 141. Even in this case, each of the vibration motors 1a, 1b, and 1c is able to achieve a reduced radial dimension.

Figure 23:
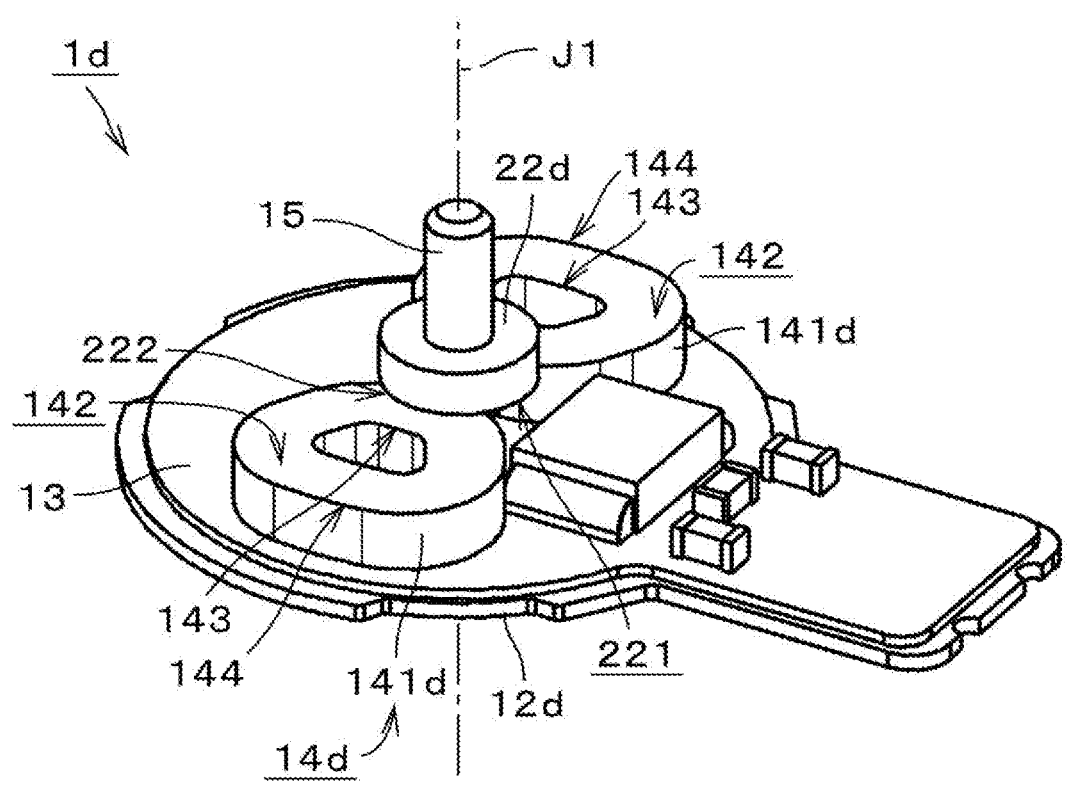
FIG. 23 is a perspective view of a stationary portion of a vibration motor according to a fifth preferred embodiment of the present invention.
Figure 24:
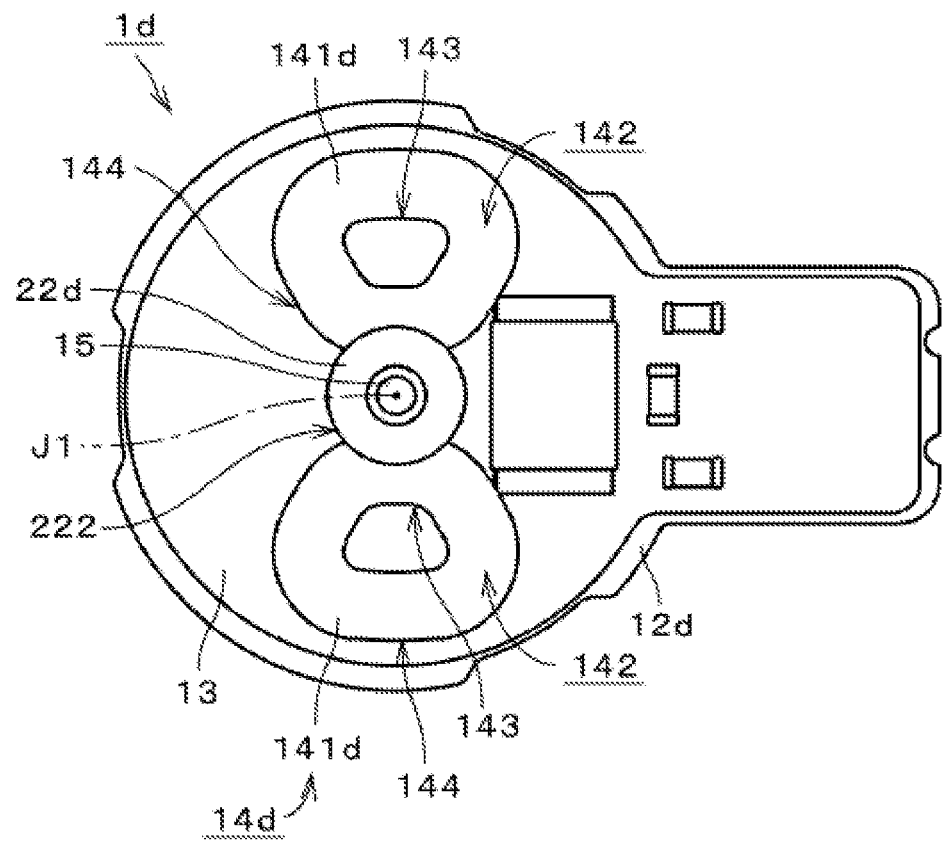
FIG. 24 is a plan view of the stationary portion according to the fifth preferred embodiment of the present invention.
Figure 25:
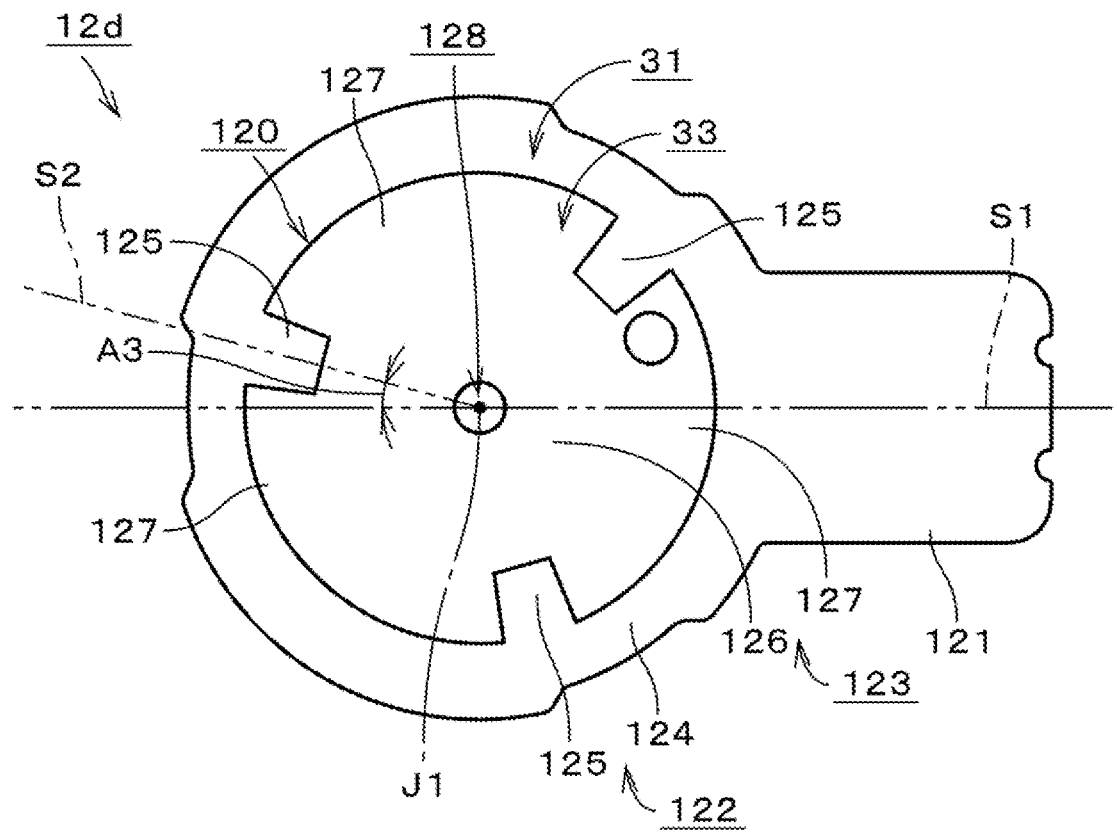
FIG. 25 is a plan view of a base portion according to the fifth preferred embodiment of the present invention.
Figure 26:
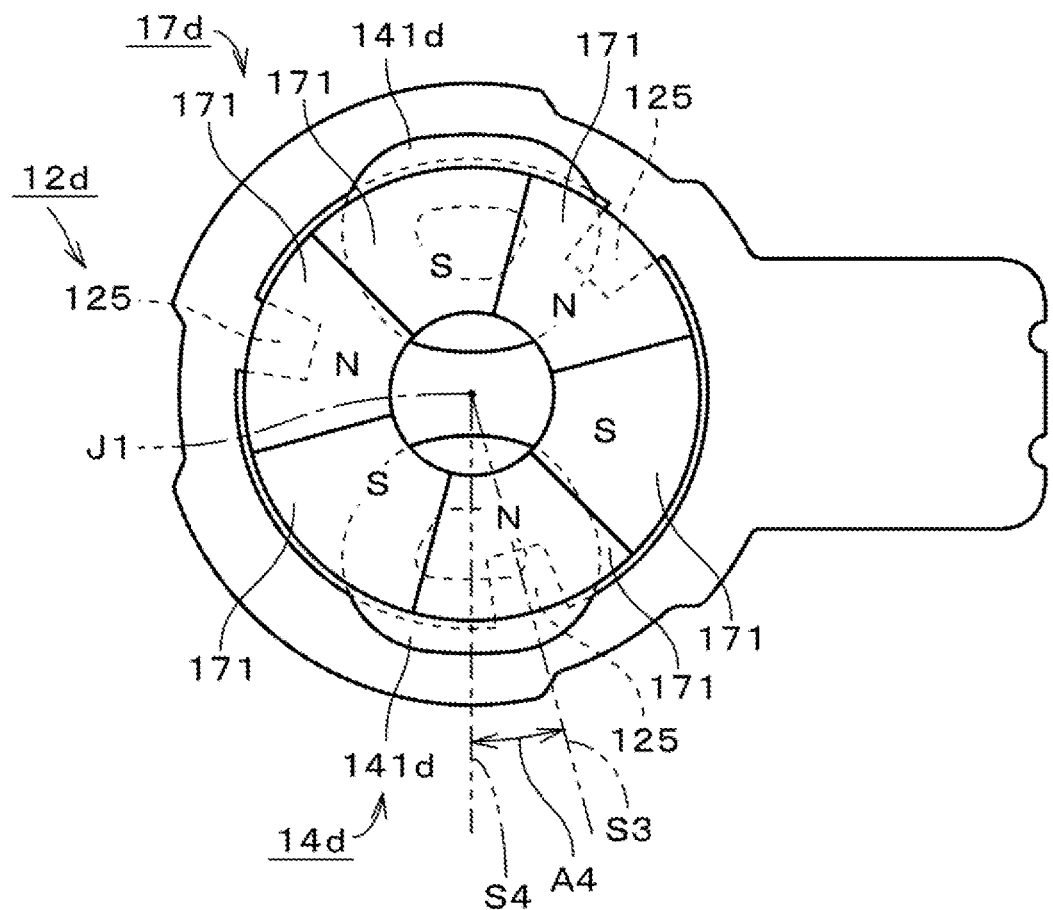
FIG. 26 is a plan view of a magnet portion, a coil portion, and the base portion according to the fifth preferred embodiment of the present invention.

FIG. 23 is a perspective view illustrating a stationary portion of a vibration motor 1d according to a fifth preferred embodiment of the present invention. FIG. 24 is a plan view of the stationary portion of the vibration motor 1d. FIG. 25 is a plan view of a base portion 12d of the vibration motor 1d. FIG. 26 is a plan view illustrating a magnet portion 17d, a coil portion 14d, and the base portion 12d. FIG. 26 is a diagram illustrating an example stop position of the magnet portion 17d. The vibration motor 1d includes the magnet portion 17d, the coil portion 14d, the base portion 12d, and a spacer 22d, which are different in shape from the magnet portion 17, the coil portion 14, the base portion 12, and the spacer 22, respectively, of the vibration motor 1 illustrated in FIGS. 1 to 6. The vibration motor 1d is otherwise similar in structure to the vibration motor 1 illustrated in FIGS. 1 to 6, and accordingly, like members or portions are designated by like reference numerals.

In the vibration motor 1d illustrated in FIGS. 23 to 26, the magnet portion 17d includes a plurality of magnetic poles 171. The number of magnetic poles 171 is, for example, a multiple of two. In the preferred embodiment illustrated in FIG. 26, the number of magnetic poles 171 is six. That is, the magnet portion 17d includes three north poles and three south poles. The three north poles and the three south poles are arranged to alternate with each other in the circumferential direction. The magnetic poles 171 are arranged at equal angular intervals in the circumferential direction. In the preferred embodiment illustrated in FIG. 26, the six magnetic poles 171 are arranged at intervals of 60 degrees. In other words, in a plan view, an angle defined between a straight line that joins a circumferential middle of each magnetic pole 171 and a central axis J1, and a straight line that joins a circumferential middle of the magnetic pole 171 adjacent thereto and the central axis J1, is 60 degrees.

The coil portion 14d is arranged radially opposite to a shaft 15 with a gap therebetween. The coil portion 14d includes at least one coil 141d arranged around the shaft 15. The number of the at least one coil 141d is equal to or smaller than the number of magnetic poles 171 of the magnet portion 17d. In the preferred embodiment illustrated in FIG. 23, the at least one coil 141d is two in number. The two coils 141d are arranged on opposite sides of the shaft 15. Note that the number of coils 141d included in the coil portion 14d may alternatively be more than two. Each coil 141d is fixed onto a circuit board 13 through an adhesive, for example. In the preferred embodiment illustrated in FIG. 24, in a plan view, each coil 141d is annular, and is arranged to surround an axis parallel to the shaft 15, with the shaft 15 arranged outside of the coil 141d.

The spacer 22d is attached to the shaft 15. A lower surface 221 of the spacer 22d is arranged opposite to an upper surface of the coil portion 14d in the vertical direction. In the preferred embodiment illustrated in FIG. 23, the lower surface 221 of the spacer 22d is arranged to be in contact with the upper surface of the coil portion 14d. In more detail, the lower surface 221 of the spacer 22d is arranged to be in contact with an upper surface 142 of each of the two coils 141d of the coil portion 14d. As illustrated in FIGS. 23 and 24, an entire inner circumferential edge 143 of the upper surface 142 of each coil 141d is arranged radially outside of an outer edge 222 of the lower surface 221 of the spacer 22d. In addition, a portion of an outer circumferential edge 144 of the upper surface 142 of each coil 141d is arranged radially inside of the outer edge 222 of the lower surface 221 of the spacer 22d. In other words, the lower surface 221 of the spacer 22d lies over a portion of the upper surface 142 of each coil 141d, but does not lie over an opening defined in a central portion of the upper surface 142.

Similarly to the base portion 12 illustrated in FIG. 6, the base portion 12d includes a base magnetic portion 122 and a base nonmagnetic portion 123. The base nonmagnetic portion 123 is fixed to an edge portion of the base magnetic portion 122, and is arranged to extend from the edge portion of the base magnetic portion 122 substantially perpendicularly to the vertical direction. The base magnetic portion 122 includes a magnetic outer circumferential portion 124 and a plurality of magnetic element portions 125. The base nonmagnetic portion 123 includes a nonmagnetic central portion 126 and a plurality of nonmagnetic element portions 127.

The magnetic outer circumferential portion 124 is arranged to surround an outer periphery of the base nonmagnetic portion 123. Each of the magnetic element portions 125 is defined integrally with the magnetic outer circumferential portion 124. Each of the magnetic element portions 125 is arranged to project radially inward from the magnetic outer circumferential portion 124. The circumferential width of each of the magnetic element portions 125 is arranged to decrease in the radially inward direction. The magnetic element portions 125 are arranged in the circumferential direction, and are arranged at positions opposed to the magnet portion 17d in the vertical direction. The magnetic element portions 125 are arranged at equal angular intervals in the circumferential direction. In the preferred embodiment illustrated in FIG. 25, the number of magnetic element portions 125 is three, and the three magnetic element portions 125 are arranged at intervals of 120 degrees.

A base central through hole 128, which passes through the base portion 12d in the vertical direction, is defined in a central portion of the nonmagnetic central portion 126. Each of the nonmagnetic element portions 127 is defined integrally with the nonmagnetic central portion 126. Each of the nonmagnetic element portions 127 is arranged to project radially outward from the nonmagnetic central portion 126. The circumferential width of each of the nonmagnetic element portions 127 is arranged to increase in the radially outward direction. The nonmagnetic element portions 127 are arranged in the circumferential direction, and are arranged at positions opposed to the magnet portion 17d in the vertical direction. The nonmagnetic element portions 127 are arranged at equal angular intervals in the circumferential direction. In the preferred embodiment illustrated in FIG. 25, the number of nonmagnetic element portions 127 is three, and the three nonmagnetic element portions 127 are arranged at intervals of 120 degrees.

A first plane S1 is an imaginary plane including the central axis J1 and a circumferential middle of a base projecting portion 121. A second plane S2 is an imaginary plane including the central axis J1 and a circumferential middle of one of the magnetic element portions 125 that is closest to the first plane S1 in the circumferential direction of all the magnetic element portions 125. An angle A3 defined between the first plane S1 and the second plane S2 is, for example, 15 degrees. The angle A3 is equal to 90 degrees divided by the number of magnetic poles 171.

The number of magnetic element portions 125 of the base portion 12d is preferably equal to or smaller than the number of magnetic poles 171. In the preferred embodiment illustrated in FIG. 26, the number of magnetic element portions 125 is equal to a half of the number of magnetic poles 171. In FIG. 26, a coil middle plane S4, which is an imaginary plane including the central axis J1 and a circumferential middle of each coil 141d, is represented by a chain double-dashed line.

In the vibration motor 1d, as in the vibration motor 1 described above, the base magnetic portion 122 and the base nonmagnetic portion 123 do not overlap with each other at any position outside of a boundary portion between the base magnetic portion 122 and the base nonmagnetic portion 123 when viewed in the vertical direction. This allows the base portion 12d to have a smaller thickness than in the case where the base magnetic portion 122 and the base nonmagnetic portion 123 overlap with each other at a position other than the boundary portion 120. This leads to a reduced thickness of the vibration motor 1d.

In the base portion 12d, as in the base portion 12 illustrated in FIG. 7, the base magnetic portion 122 and the base nonmagnetic portion 123 do not overlap with each other even at the boundary portion 120 when viewed in the vertical direction. This contributes to a further reduction in the thickness of the base portion 12d. This in turn leads to a further reduction in the thickness of the vibration motor 1d. In addition, each of a side surface of the edge portion of the base magnetic portion 122 and a side surface of an edge portion of the base nonmagnetic portion 123 is arranged to be substantially parallel to the vertical direction, and this makes it easier to define the edge portion of the base magnetic portion 122 and the edge portion of the base nonmagnetic portion 123. This makes it easier to manufacture the base portion 12d.

Over an area where an upper surface of the base portion 12d is covered with the circuit board 13, an upper surface 31 of the base magnetic portion 122 and an upper surface 33 of the base nonmagnetic portion 123 are arranged at the same vertical level. This allows the circuit board 13 to be securely fixed to the upper surface of the base portion 12d. In addition, a lower surface of the base magnetic portion 122 and a lower surface of the base nonmagnetic portion 123 are also arranged at the same vertical level. This prevents a projecting portion from being defined in the lower surface of the base portion 12d. This contributes to a further reduction in the thickness of the base portion 12d. This in turn leads to a further reduction in the thickness of the vibration motor 1d.

In the vibration motor 1d, the base magnetic portion 122 and the base nonmagnetic portion 123 may be arranged to overlap with each other at the boundary portion 120 when viewed in the vertical direction, as illustrated in FIGS. 9 and 10. When the base magnetic portion 122 and the base nonmagnetic portion 123 are arranged to overlap with each other at the boundary portion 120 when viewed in the vertical direction, an area of contact between the base magnetic portion 122 and the base nonmagnetic portion 123 at the boundary portion 120 is increased. This allows the base magnetic portion 122 and the base nonmagnetic portion 123 to be securely fixed to each other.

In the vibration motor 1d, once supply of an electric current to the coil 141d of the coil portion 14d is stopped, cogging torque generated between the magnetic element portions 125 of the base magnetic portion 122 and the magnet portion 17d causes the rotating portion to stop with, of the magnetic poles 171 of the magnet portion 17d, the three north poles or the three south poles positioned over the three magnetic element portions 125, respectively. In FIG. 26, each of the three north poles is positioned over a separate one of the three magnetic element portions 125. In more detail, the rotating portion is caused to stop with the circumferential middle of each north pole of the magnet portion 17d positioned opposite to the circumferential middle of a separate one of the magnetic element portions 125 in the vertical direction.

In the preferred embodiment illustrated in FIG. 26, each of the at least one coil 141d mentioned above is arranged to be circumferentially displaced from one of the magnetic poles 171 (hereinafter, this magnetic pole 171 will be referred to as a "reference magnetic pole") by an "angle equal to 2M-1 times an angle obtained by dividing 90 degrees by the number of magnetic poles 171". Here, M is a natural number equal to or smaller than twice the number of magnetic poles. Because the number of magnetic poles 171 is six, each coil 141d is arranged at a position circumferentially displaced from the reference magnetic pole by "15 degrees×(2M-1)".

For example, if the north pole at the bottom in FIG. 26 is regarded as the reference magnetic pole, the coil 141d on the lower side in FIG. 26 is arranged at a position circumferentially, in a clockwise direction, displaced from the reference magnetic pole by 15 degrees. In other words, an angle A4 defined between the coil middle plane S4, which is the imaginary plane including the central axis J1 and the circumferential middle of this coil 141d, and a third plane S3, which is an imaginary plane including the circumferential middle of the reference magnetic pole and the central axis J1, is 15 degrees, which is once 15 degrees. Meanwhile, the coil 141d on the upper side in FIG. 26 is arranged at a position circumferentially, in the clockwise direction, displaced from the reference magnetic pole by 195 degrees. In other words, an angle defined between an imaginary plane including the circumferential middle of this coil 141d and the central axis J1 and the aforementioned third plane S3 is 195 degrees, which is 13 times 15 degrees.

As described above, in the vibration motor 1d, the magnetic poles 171 are arranged at intervals of 60 degrees. Accordingly, the circumferential middle of the magnetic pole 171 that is closest to each coil 141d in the circumferential direction is circumferentially displaced from the circumferential middle of the coil 141d by 15 degrees. Each magnetic pole 171 is thus prevented from being positioned at any dead point, which would prohibit the rotating portion from starting rotating, when the rotating portion is in the stopped state.

As described above, in the vibration motor 1d, the coil portion 14d includes the at least one coil 141d arranged around the shaft 15, and the number of the at least one coil 141d is equal to or smaller than the number of magnetic poles 171 of the magnet portion 17d. This contributes to preventing the circumferential middle of each coil 141d from coinciding with the circumferential middle of any magnetic pole 171 when viewed in the vertical direction.

This makes it easier to prevent each magnetic pole 171 of the magnet portion 17d from being positioned at any dead point when the rotating portion is in the stopped state.

In order to easily prevent each magnetic pole 171 from being positioned at any dead point when the rotating portion is in the stopped state, it is preferable that the number of coils 141d be two, the number of magnetic poles 171 of the magnet portion 17d be six, and the number of magnetic element portions 125 be three, as described above.

As described above, each of the at least one coil 141d is arranged to be circumferentially displaced from one of the magnetic poles 171 by an "angle equal to 2M−1 times an angle obtained by dividing 90 degrees by the number of magnetic poles 171". This contributes to preventing the circumferential middle of each coil 141d from coinciding with the circumferential middle of any magnetic pole 171 when viewed in the vertical direction. This makes it still easier to prevent each magnetic pole 171 of the magnet portion 17d from being positioned at any dead point when the rotating portion is in the stopped state.

The number of magnetic poles 171 of the magnet portion 17d is a multiple of two, and this contributes to easily preventing the circumferential middle of each of the magnetic poles 171 from coinciding with the circumferential middle of any of the two coils 141d when viewed in the vertical direction. In other words, each magnetic pole 171 of the magnet portion 17d can be easily prevented from being positioned at any dead point when the rotating portion is in the stopped state. In addition, in the magnet portion 17d, the magnetic poles 171 are arranged at equal angular intervals in the circumferential direction. This contributes to more easily preventing the circumferential middle of each of the magnetic poles 171 from coinciding with the circumferential middle of any of the two coils 141d when viewed in the vertical direction. In other words, each magnetic pole 171 of the magnet portion 17d can be more easily prevented from being positioned at any dead point when the rotating portion is in the stopped state.

As described above, the number of magnetic element portions 125 is equal to or smaller than the number of magnetic poles 171. This contributes to increasing the probability that the circumferential middle of any magnetic pole 171 will be positioned over the circumferential middle of each magnetic element portion 125 when the rotating portion stops. This makes it easier to prevent each magnetic pole 171 of the magnet portion 17d from being positioned at any dead point when the rotating portion is in the stopped state. In addition, the angle A3 defined between the first plane S1 and the second plane S2 is equal to 90 degrees divided by the number of magnetic poles 171. This contributes to more easily preventing each magnetic pole 171 of the magnet portion 17d from being positioned at any dead point when the rotating portion is in the stopped state.

As described above, the lower surface 221 of the spacer 22d is arranged opposite to the upper surface of the coil portion 14d in the vertical direction. Thus, in the vibration motor 1d, the coil 141d of the coil portion 14d can be arranged radially closer to the shaft 15 than in a vibration motor in which a spacer is arranged radially inside of a plurality of coils arranged around a shaft. This contributes to reducing the radial dimension of the vibration motor 1d while limiting a reduction in vibrations of the vibration motor 1d.

As described above, the lower surface 221 of the spacer 22d is arranged to be in contact with the upper surface 142 of each of the coils 141d. This contributes to reducing the vertical dimension of the vibration motor 1d. In addition, if the vibration motor 1d falls, for example, vertical movement of the coil 141d is limited, and this contributes to preventing the coil 141d from being detached from the circuit board 13. Further, a difference between the vertical positions of the upper surfaces 142 of the coils 141d can be prevented, and this makes it easy to secure a vertical distance between the coil portion 14d and the magnet portion 17d, that is, a gap between the coil portion 14d and the magnet portion 17d.

Figure 27:
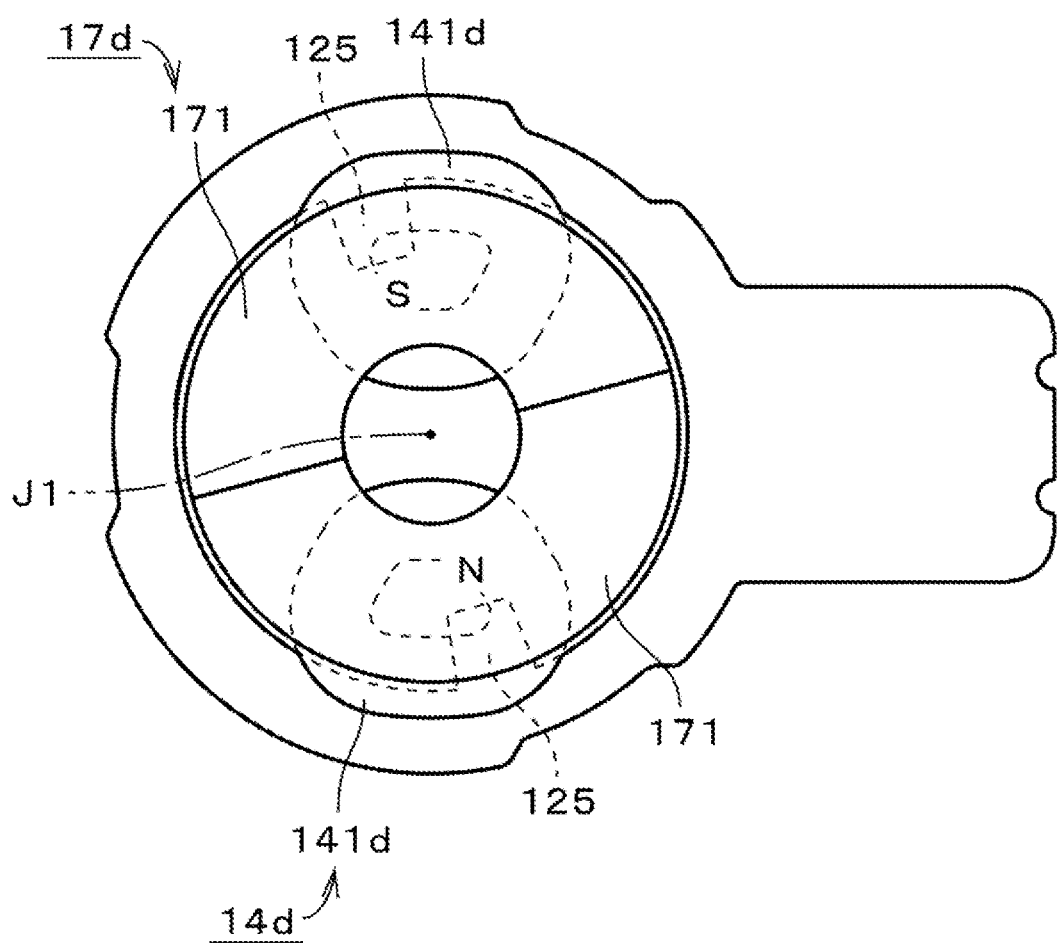
FIG. 27 is a plan view of a magnet portion, a coil portion, and a base portion according to a modification of the fifth preferred embodiment of the present invention.

Note that, in the vibration motor 1d, the number of magnetic poles 171 and the number of magnetic element portions 125 may be modified in various manners. As illustrated in FIG. 27, the number of magnetic poles 171 may alternatively be two. The number of magnetic element portions 125 may also alternatively be two. In a modification of the fifth preferred embodiment illustrated in FIG. 27, the number of the at least one coil 141d of the coil portion 14d is equal to the number of magnetic poles 171 of the magnet portion 17d. This contributes to easily preventing the circumferential middle of each of the magnetic poles 171 from coinciding with the circumferential middle of any of the coils 141d when viewed in the vertical direction. In other words, each magnetic pole 171 of the magnet portion 17d can be easily prevented from being positioned at any dead point when the rotating portion is in the stopped state.

Note that each of the vibration motors 1 and 1a to 1d described above may be modified in various manners.

The cover portion 11 may alternatively be made of any desirable material other than metals.

In each of the base portions 12, 12a, 12b, and 12d, the upper surface 31 of the base magnetic portion 122 and the upper surface 33 of the base nonmagnetic portion 123 may alternatively be arranged at different vertical levels in an area where the upper surfaces 31 and 33 are covered with the circuit board 13. Also, the lower surface 32 of the base magnetic portion 122 and the lower surface 34 of the base nonmagnetic portion 123 may alternatively be arranged at different vertical levels. Further, the upper surface of the entire portion of the base portion 12, 12a, 12b, or 12d which lies between the shaft 15 and the magnetic element portions 125 and the nonmagnetic element portions 127 may not necessarily be arranged at the same vertical level. For example, a portion of the upper surface of each of the base portions 12, 12a, 12b, and 12d which lies around the shaft 15 may be arranged to project upward relative to the remaining portion thereof and to be in contact with a lower end portion of the shaft 15, so that the shaft 15 can be securely fixed to the base portion 12, 12a, 12b, or 12d.

Note that the shape of each of the base magnetic portion 122 and the base nonmagnetic portion 123 may be modified in various manners, as long as the base magnetic portion 122 and the base nonmagnetic portion 123 include the plurality of magnetic element portions 125 and the plurality of nonmagnetic element portions 127, respectively, which are arranged in the circumferential direction, and which are arranged at the positions opposed to the magnet portion 17 or 17d in the vertical direction. Also note that the shape of each of the magnetic element portions 125 and the nonmagnetic element portions 127, the number of magnetic element portions 125, and the number of nonmagnetic element portions 127 may be modified in various manners. For example, in each of the base portion 12 illustrated in FIG. 6, the base portion 12b illustrated in FIG. 17, and the base portion 12d illustrated in FIG. 25, each of the magnetic element portions 125 may alternatively be spaced from the magnetic outer circumferential portion 124. Also, each of the nonmagnetic element portions 127 may alternatively be spaced from the nonmagnetic central portion 126. In the base portion 12a illustrated in FIG. 16, each of the magnetic element portions 125 may alternatively be spaced from the magnetic central portion 124a. Also, each of the nonmagnetic element portions 127 may alternatively be spaced from the nonmagnetic outer circumferential portion 126a.

The magnetic element portions 125 may not necessarily be arranged at equal angular intervals in the circumferential direction, but angles defined between different pairs of adjacent ones of the magnetic element portions 125 may be different. The nonmagnetic element portions 127 may not necessarily be arranged at equal angular intervals in the circumferential direction, but angles defined between different pairs of adjacent ones of the nonmagnetic element portions 127 may be different.

Each of the base portions 12, 12a, 12b, and 12d may not necessarily be provided with the base central through hole 128 in which the lower end of the shaft 15 is fixed. Also, the base peripheral through hole 129, which is arranged at a position away from the shaft 15, may alternatively be defined in the magnetic outer circumferential portion 124 or the nonmagnetic outer circumferential portion 126a. The base peripheral through hole 129 may not necessarily be provided. The board peripheral through hole 132 of the circuit board 13 may not necessarily be provided, either.

The lower surface 221 of each of the spacers 22 and 22a to 22d may alternatively be spaced upward from the upper surface of the coil portion 14 or 14d, as long as the lower surface 221 is arranged opposite to the upper surface of the coil portion 14 or 14d in the vertical direction. The lower surface 221 of each of the spacers 22 and 22a to 22d may not necessarily be arranged opposite to the upper surface of the coil portion 14 or 14d in the vertical direction. Each of the spacers 22 and 22a to 22c may alternatively be arranged radially inside of the coil 141 of the coil portion 14, that is, between the inner circumferential surface of the coil 141 and the shaft 15. The spacer 22d may alternatively be arranged between the shaft 15 and the plurality of coils 141d of the coil portion 14d and radially inside of the coils 141d.

In each of the magnet portions 17 and 17d, the number of magnetic poles 171 may be modified appropriately. Also, the magnetic poles 171 may not necessarily be arranged at equal angular intervals in the circumferential direction, but angles defined between different pairs of adjacent ones of the magnetic poles 171 may be different. The number of magnetic poles 171 may alternatively be smaller than the number of magnetic element portions 125.

In the vibration motor 1d, the number of coils 141d of the coil portion 14d may alternatively be greater than the number of magnetic poles 171 of the magnet portion 17d.

Attachment and fixing of each member of each of the vibration motors 1 and 1a to 1d may be achieved in an indirect manner. For example, the circuit board 13 may alternatively be arranged above the base portion 12, 12a, 12b, or 12d with another member intervening between the circuit board 13 and the base portion 12, 12a, 12b, or 12d. Also, each of the coil portions 14 and 14d may be attached to the circuit board 13 with another member intervening therebetween. Also, the attachment of the shaft 15 to the cover portion 11 and the base portion 12, the attachment of each of the magnet portions 17 and 17d to a corresponding one of the rotor holders 16 and 16a to 16c, the attachment of each of the eccentric weights 18 and 18a to a corresponding one of the rotor holders 16 and 16a to 16c, the fixing of the cover portion 11 to the base portion 12, and so on may be achieved with an intervention of another member.

Features of the above-described preferred embodiments and the modifications thereof may be combined appropriately as long as no conflict arises.

Vibration motors according to preferred embodiments of the present invention may be used for various purposes. Vibration motors according to preferred embodiments of the present invention are preferably used as silent notification devices in mobile communication apparatuses, such as, for example, cellular phones.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor comprising:
a base portion that extends perpendicularly to a central axis extending in a vertical direction;
a shaft including a lower end fixed to the base portion, and projecting upward along the central axis;
a circuit board above the base portion;
a coil portion attached to the circuit board, and radially opposite to the shaft with a gap therebetween;
a bearing portion attached to the shaft to be rotatable with respect to the shaft above the coil portion;
a rotor holder attached to the bearing portion;
a magnet portion including a plurality of magnetic poles, and attached to the rotor holder;
an eccentric weight attached to the rotor holder; and
a cover portion that covers, at least in part, upper and lateral sides of the rotor holder and the eccentric weight, and fixed to an upper end of the shaft and an outer edge portion of the base portion; wherein
the base portion includes:
a base magnetic portion made of a magnetic metal; and
a base nonmagnetic portion made of a nonmagnetic metal, fixed to an edge portion of the base magnetic portion, and extending from the edge portion of the base magnetic portion perpendicularly to the vertical direction;
the base magnetic portion includes a plurality of magnetic element portions arranged in a circumferential direction, and provided at positions opposed to the magnet portion in the vertical direction;
the base nonmagnetic portion is defined b a single continuous monolithic member which includes a plurality of integrally provided nonmagnetic element portions arranged to alternate with the magnetic element portions in the circumferential direction, and provided at positions opposed to the magnet portion in the vertical direction;
the base magnetic portion includes a first boundary portion where the base magnetic portion is in contact with the base nonmagnetic portion;
the base nonmagnetic portion includes a second boundary portion where the base nonmagnetic portion is in contact with the base magnetic portion;
an area where the first and second boundary portions are in contact with each other is defined as a boundary portion; and
the base magnetic portion and the base nonmagnetic portion do not overlap with each other at any position outside of the boundary portion when viewed in the vertical direction the base magnetic portion further includes a magnetic outer circumferential portion that surrounds an outer periphery of the base nonmagnetic portion; each of the magnetic element portions projects radially inward from the magnetic outer circumferential portion; the base nonmagnetic portion further includes a nonmagnetic central portion to which the lower end of the shaft is fixed; and each of the nonmagnetic element portions projects radially outward from the nonmagnetic central portion.

2. The vibration motor according to claim 1, wherein the base magnetic portion and the base nonmagnetic portion do not overlap with each other even at the boundary portion when viewed in the vertical direction.

3. The vibration motor according to claim 1, wherein the base magnetic portion and the base nonmagnetic portion overlap with each other at the boundary portion when viewed in the vertical direction.

4. The vibration motor according to claim 1, wherein an upper surface of the base magnetic portion and an upper surface of the base nonmagnetic portion are arranged at a same vertical level over an area where an upper surface of the base portion is covered with the circuit board.

5. The vibration motor according to claim 4, wherein a lower surface of the base magnetic portion and a lower surface of the base nonmagnetic portion are arranged at a same vertical level.

6. The vibration motor according to claim 5, wherein a radially inner end portion of each of the magnetic element portions is opposite to the magnet portion in the vertical direction.

7. The vibration motor according to claim 6, wherein a circumferential width of a portion of each magnetic element portion which is opposed to the magnet portion in the vertical direction is equal to or smaller than a circumferential width of each magnetic pole of the magnet portion at any radial position.

8. The vibration motor according to claim 7, wherein a circumferential width of each of the magnetic element portions decreases in a radially inward direction.

9. The vibration motor according to claim 5, wherein
the base nonmagnetic portion further includes a nonmagnetic outer circumferential portion arranged to surround an outer periphery of the base magnetic portion;
each of the nonmagnetic element portions projects radially inward from the nonmagnetic outer circumferential portion;
the base magnetic portion further includes a magnetic central portion to which the lower end of the shaft is fixed; and
each of the magnetic element portions projects radially outward from the magnetic central portion.

10. The vibration motor according to claim 9, wherein a circumferential width of each of the magnetic element portions decreases in a radially outward direction.

11. The vibration motor according to claim 9, further comprising a spacer attached to the shaft between the bearing portion and the coil portion, and including an upper surface in contact with a lower surface of the bearing portion, wherein a lower surface of the spacer is opposite to an upper surface of the coil portion in the vertical direction.

12. The vibration motor according to claim 11, wherein a number of magnetic poles is a multiple of two.

13. The vibration motor according to claim 12, wherein a number of magnetic element portions is equal to or smaller than the number of magnetic poles.

14. The vibration motor according to claim 13, wherein the magnetic poles are arranged at equal angular intervals in the circumferential direction.

15. The vibration motor according to claim 14, wherein
the number of magnetic element portions is equal to the number of magnetic poles; and
the magnetic element portions are arranged at equal angular intervals in the circumferential direction.

16. The vibration motor according to claim 1, wherein
the base portion further includes a base projecting portion that projects radially outward from the cover portion; and
an angle defined between a first plane and a second plane is equal to 90 degrees divided by a number of magnetic poles of the magnet portion, the first plane including the central axis and a circumferential middle of the base projecting portion, the second plane including the central axis and a circumferential middle of one of the magnetic element portions that is closest to the first plane in the circumferential direction.

17. The vibration motor according to claim 16, wherein the coil portion is defined by a single annular coil inside of which the shaft is arranged.

18. The vibration motor according to claim 16, wherein
the coil portion includes at least one coil arranged around the shaft; and
a number of the at least one coil is equal to or smaller than the number of magnetic poles of the magnet portion.

19. The vibration motor according to claim 18, wherein
the number of the at least one coil is two;
the number of magnetic poles of the magnet portion is six; and
a number of magnetic element portions is three.

20. The vibration motor according to claim 18, wherein the number of the at least one coil is equal to the number of magnetic poles of the magnet portion.

21. The vibration motor according to claim 18, wherein each of the at least one coil is circumferentially displaced from one of the magnetic poles by an angle equal to 2M−1 times an angle obtained by dividing 90 degrees by the number of magnetic poles, where M is a natural number equal to or smaller than twice the number of magnetic poles.

22. The vibration motor according to claim 16, wherein
the base portion further includes a base central through hole passing therethrough in the vertical direction; and
the lower end of the shaft is fixed in the base central through hole.

23. The vibration motor according to claim 22, wherein an upper surface of an entire portion of the base portion which lies between the shaft and the magnetic element portions and the nonmagnetic element portions is arranged at a same vertical level.

24. The vibration motor according to claim 23, wherein
the base portion further includes a base peripheral through hole at a position away from the shaft; and
the circuit board includes a board peripheral through hole that overlaps with the base peripheral through hole when viewed in the vertical direction.

25. The vibration motor according to claim 24, wherein
one of the base nonmagnetic portion and the base magnetic portion surrounds an outer periphery of another one of the base nonmagnetic portion and the base magnetic portion; and
the base peripheral through hole is defined in the other one of the base nonmagnetic portion and the base magnetic portion.

* * * * *